(12) United States Patent
McNally et al.

(10) Patent No.: US 11,302,291 B1
(45) Date of Patent: *Apr. 12, 2022

(54) DEVICE AGNOSTIC USER INTERFACE GENERATION

(71) Applicant: Amazon Technologies, Inc., Seattle, WA (US)

(72) Inventors: Bradley McNally, Seattle, WA (US); Kynan Dylan Antos, Seattle, WA (US); Jennifer Lynne Cotton, San Francisco, CA (US); Jonathan Mongan, Kirkland, WA (US); Sahil Ahmed Yousif Anand, Seattle, WA (US); Timothy Thomas Gray, Seattle, WA (US); Ryan Long, San Francisco, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/697,956

(22) Filed: Nov. 27, 2019

(51) Int. Cl.
*G09G 5/373* (2006.01)
*G06F 3/14* (2006.01)

(52) U.S. Cl.
CPC .......... *G09G 5/373* (2013.01); *G06F 3/1423* (2013.01); *G09G 2354/00* (2013.01); *G09G 2360/04* (2013.01)

(58) Field of Classification Search
CPC .............. G09G 5/373; G09G 2354/00; G09G 2360/04; G06F 3/1423
See application file for complete search history.

(56) References Cited

U.S. PATENT DOCUMENTS

| | | | | |
|---|---|---|---|---|
| 2009/0158179 | A1* | 6/2009 | Brooks | G06F 40/186 715/762 |
| 2013/0195204 | A1* | 8/2013 | Reznik | H04N 21/2343 375/240.26 |
| 2015/0091947 | A1* | 4/2015 | Rakow | G09G 5/373 345/667 |
| 2015/0371438 | A1* | 12/2015 | Sachter-Zeltzer | G06F 3/048 345/427 |
| 2016/0366454 | A1* | 12/2016 | Tatourian | H04N 21/2393 |
| 2017/0060821 | A1* | 3/2017 | Rucine | G06F 40/106 |
| 2018/0090052 | A1* | 3/2018 | Marsh | G09G 3/001 |
| 2018/0204364 | A1* | 7/2018 | Hoffman | F41G 3/08 |
| 2018/0247610 | A1* | 8/2018 | Carey | G06K 9/00255 |
| 2019/0035364 | A1* | 1/2019 | Iwasaki | G09G 5/373 |
| 2019/0289335 | A1* | 9/2019 | Grois | H04N 19/86 |
| 2020/0241635 | A1* | 7/2020 | Cohen | G06F 3/147 |

* cited by examiner

*Primary Examiner* — Michael Le
(74) *Attorney, Agent, or Firm* — Eversheds-Sutherland (US) LLP

(57) ABSTRACT

Systems, methods, and computer-readable media are disclosed for systems and methods for device agnostic user interface generation. Example methods include receiving a request for content from a device, determining first data representing a first device characteristic of the device, and determining an intended viewing distance value associated with the first data. Some methods include determining, using the intended viewing distance value, a first value for the device, the first value representing a baseline density-independent number of pixels, determining first content using the first value, and sending the first content to the device, where the first content is to be rendered at the device.

20 Claims, 18 Drawing Sheets

DEVICE AGNOSTIC USER INTERFACE GENERATION

BACKGROUND

Users may interact with different electronic devices, which have different operating systems, display sizes, input types, and so forth. In addition, different electronic devices may be used differently. For example, wearable devices may be used in a manner different than a television. The display size shape can also differ across devices. Accordingly, presentation of content in a device-agnostic manner may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1A:
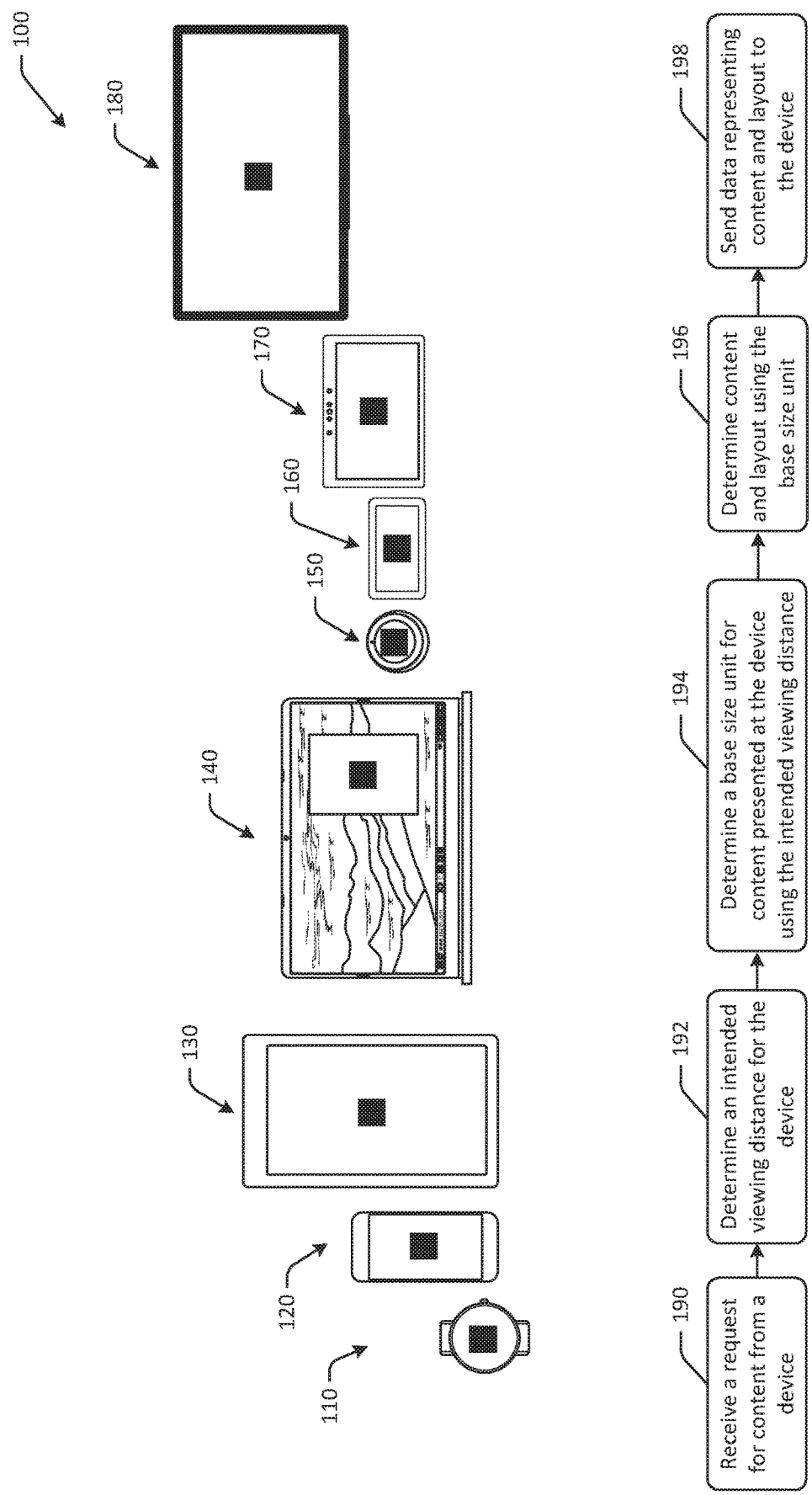
FIG. 1A is a schematic illustration of an example use case and process flow for device agnostic user interface generation in accordance with one or more example embodiments of the disclosure.

Electronic devices, such as tablets, smartphones, computers, content streaming devices, smart home devices, and the like may be used to consume content. For example, digital content, such as visual content and audio content, may be requested by a user and presented at one or more electronic devices for consumption by users. To request content for consumption, users may interact with one or more electronic devices. User interactions with electronic devices may include voice interactions and physical interactions. For example, users may use remote controls and other devices to control or make other types of inputs at other devices. In another example, users may audibly speak voice commands to a device that may detect the user's utterance and may determine a meaning of the utterance. In some instances, the device that detects the user's utterance may be a device that is configured to present content, such as a content streaming device coupled to a television or other display. In another instance, the device that detects the user's utterance may be separate from the device that is configured to present content, and one or both devices may be in communication with a remote system.

Devices may also have different display sizes, different operating systems, different display resolutions, and other characteristics that may impact the ability of a particular device to present a graphical user interface. For example, content that is presented at the device, as well as the layout of the content, may be different at a device with a display having a round shape compared to a device with a display having a rectangular shape. In another example, devices that have different sizes may be configured to present different amounts of content or density of content.

To present the same content at different devices, user interfaces for specific devices or device operating systems may be generated. Provided herein are solutions to make it easier and less time confusing for developers to generate graphical interfaces for a plurality of different operating systems, which can result in content being presented by the devices that fall into different categories.

Embodiments of the disclosure allow for user interfaces to be automatically generated for any number of devices and device types, regardless of operating system. Some embodiments are configured for device agnostic user interface generation using device characteristics, such as display size, display resolution, display density, device operating mode (e.g., touch mode vs. voice mode, etc.), an intended viewing distance for the device, and/or other characteristics to determine not only content for presentation at a device, but content layout as well. Because embodiments do not rely on an operating system of a device to generate a user interface for the device, user interfaces may be generated for any number of devices.

To provide consistent and accurate presentation of content at user interfaces, certain embodiments may use a base size unit determination for individual devices to ensure that the system scales across viewing distances. A base size unit may be numerical value representing a density-independent pixel value that is determined for an individual device based on its device characteristics, such that from a user's perspective the base size unit appears to be the same size with respect to other devices when viewed from an intended viewing distance (e.g., a hypothetical distance from which a user views the display, etc.), as discussed with respect to FIG. 1B. The intended viewing distance may not represent an actual distance from which a viewer is viewing the display, but may instead be a distance value at which a user is presumed to view a display of a certain size, and may be a predetermined value. A base size unit for a device may be a unit of measure that is independent of viewing distance. Base size units when measured in physical units (e.g., millimeters, etc.) may be different for different devices.

Figure 1B:
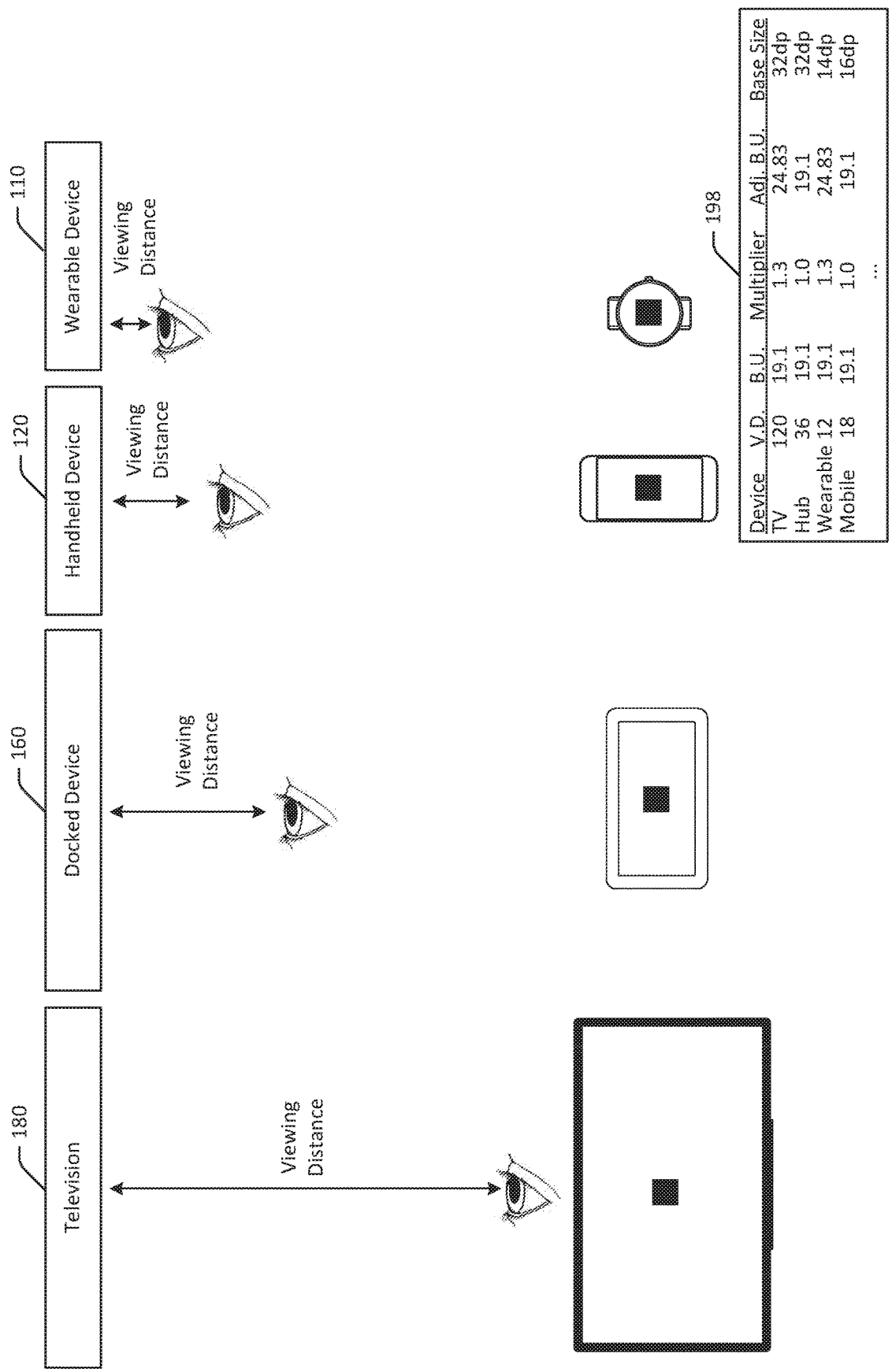
FIG. 1B is a schematic illustration of an example use case of intended viewing distances and base size unit in accordance with one or more example embodiments of the disclosure.

Referring to FIGS. 1A and 1B, in FIG. 1A, an example use case 100 and process flow for device agnostic user interface generation is depicted in accordance with one or more example embodiments of the disclosure. In FIG. 1A, a number of devices are illustrated, with each device display a base size unit. The devices may be at different viewing distances (into the page). However, the base size unit when viewed by a user at the intended viewing distance for each respective device may appear the same. Particularly, in some embodiments, the base size unit may have an arcminute measurement of between about 14 and about 25, such as about 15, about 16, about 17, about 18, about 19, about 20, about 21, about 22, about 23, about 24, or about 25. An arcminute is a unit of angular measurement equal to 1/60 of one degree. Since one degree is 1/360 of a complete rotation, one minute of arc is 1/21600 of a complete rotation. As a result, the base size unit when rendered by any device, may take the same amount of field of view of the user or viewer when viewed from the corresponding viewing distance for the device.

This is illustrated in FIG. 1A. Each of the devices is illustrated with a respective base size unit, and all of the base size units appear to be the same size. However, each of the devices is illustrated at a different viewing distance from the viewer. For example, a wearable device 110 may have a viewing distance of 18 inches, a smartphone may have a viewing distance of 18 inches, a tablet may have a viewing distance of 18 inches (depending on operating mode), a laptop may have a viewing distance of 24 inches, a round device 150 may have a viewing distance of 36 inches, a medium size landscape tablet 160 may have a viewing distance of 36 inches, a large size landscape table 170 may have a viewing distance of 60 inches, a television 180 may have a viewing distance of 120 inches, and so forth. In addition to viewing distance, other device characteristics, such as display size, operating mode, device input type, and so forth may be used to determine the base size unit for a specific device.

To generate a user interface for a device, an example process flow is presented and may be performed, for example, by one or more servers or at a device locally. The servers and/or device may include at least one memory that stores computer-executable instructions and at least one processor configured to access the at least one memory and execute the computer-executable instructions to perform various actions or operations, such as one or more of the operations in a process flow of FIG. 1A.

At block 190, a request for content or a user interface may be received. For example, the server may receive a request for content for presentation at a user device. At block 192, the server may determine an intended viewing distance for the device. An intended viewing distance, or viewing distance, may be a hypothetical distance (not an actual measured distance) from which a user may view the display, as discussed with respect to FIG. 1B. The intended viewing distance may be determined based at least in part on one or more of a device type of the user device, a display size of a display associated with the user device, a device operating mode, an active or available input type at the device, and/or another device characteristic as described herein. For example, an intended viewing distance for a device in a touch-input operating mode may be less than an intended viewing distance for the same device in a voice-input operating mode. At block 194, the server may determine a base size unit for content presented at the device using the intended viewing distance. For example, based at least in part on the viewing distance, a base size unit may be determined for the device as a baseline density independent pixel value. At block 196, the server may determine content and a content layout for the device using the base size unit, as discussed with respect to FIG. 2. For example, a content density, as well as the actual content selected for presentation, may change depending, at least in part, on the base size unit for the device. The content that is selected may vary depending on the base size unit, as a base size unit that takes a greater ratio of the number of pixels available at the display (e.g., a greater width and/or height, etc.) may result in images of reduced dimensions being selected, reduced amounts of text selected, and so forth. In addition, the content density may vary depending on a ratio of the base size unit when rendered in pixels to the available pixels at the display, such as a relatively lower content density for instances with greater number of pixels for a base size unit. At block 198, the server may send data representing the content and a layout of the content to the device. The device may then render the content.

In a more specific example, the server may receive a request for content for presentation at a first device executing a first operating system, where the request is associated with a first device identifier, an indication of a first operating mode active at the first device, and a first set of available inputs at the first device. The server may determine a first display size associated with the first device identifier, where the first display size is a size of a display of the first device, and may determine a first intended viewing distance value associated with the first display size. The first intended viewing distance value is a distance from which a user is to view the display. The server may determine a first value, which may be a baseline density-independent value, associated with the first intended viewing distance value, where the baseline density-independent value is converted to a number of pixels by the first device, and where the number of pixels has an arcminute value of about 19 when viewed by a user from the first intended viewing distance. The server may optionally select a first content layout for the content using the first operating mode and the first set of available inputs at the first device, and may determine first content for presentation at the first device using the baseline density-independent value. The server may send the first content to the first device for presentation, where the first content is to be rendered at the first device using a number of pixels determined using the baseline density-independent value. If, for instance, a device operating mode change occurs during presentation of a user interface, the server may receive an indication of a second operating mode active at the first device, and may determine a second set of available inputs at the first device. The server may determine a second intended viewing distance value associated with the second operating mode, and may determine a second baseline density-independent value associated with the second intended viewing distance value, where the second baseline density-independent value is converted to a number of pixels by the first device, and where the number of pixels has an arcminute value of about 19 when viewed by a user from the second intended viewing distance. The server may optionally select a second content layout for the content using the second operating mode and the second set of available inputs at the first device, and may determine second content for presentation at the first device using the second baseline density-independent value. The server may send the second content to the first device for presentation.

FIG. 1B is a schematic illustration of an example use case of intended viewing distances and base size unit in accordance with one or more example embodiments of the disclosure. In FIG. 1B, certain devices from FIG. 1A are illustrated in a top view. For example, the television 180, the docked device 160 (e.g., which may be a screen-based device that can be controlled via voice input from a user, and can therefore generate a voice-forward user interface, etc.), the handheld device 120, and the wearable device 110 are depicted in top view. In addition, example viewing distances are depicted to illustrate the relative differences in intended viewing distances between the devices. For example, the viewing distance for the television 180 may be significantly greater than the viewing distance for the wearable device.

Nonetheless, as illustrated in FIG. 1B, the base size unit appears the same on each of the devices when the device is viewed from the corresponding viewing distance. Due to the consistent arcminute measurement of the base size unit, the user may perceive the units to be the same size, although physical measurements and/or pixel measurements of the units will vary.

As a result, the same content can be presented at a number of different devices using intended viewing distances and base size units, regardless of operating system. For example, a server may receive a request for content for presentation at a second device executing a second operating system, where the request is associated with a second device identifier, and the server may determine a second display size associated with the second device identifier. The server may determine that a second intended viewing distance value associated with the second display size is equal to the first intended viewing distance value. The server may determine the baseline density-independent value, and may determine the first content for presentation at the second device using the baseline density-independent value. The server may send the first content to the second device for presentation, where the first content is to be rendered at the second device using a number of pixels determined using the baseline density-independent value.

An example table 198 is included in FIG. 1B and illustrates the relationship between devices, viewing distances, base units, multipliers of base units (that can be used to improve aesthetics of user interfaces), calculated adjusted base units (base unit multiplied by multiplier), and the corresponding base size unit. For example, the television 180 may have a viewing distance of 120 inches, a base unit of 19.1 arcminutes, a multiplier of 1.3, an adjusted base unit of 24.83, and a corresponding base size unit of 32 baseline density-independent pixels. A hub (e.g., a docked tablet 160, etc.) may have a viewing distance of 36 inches, a base unit of 19.1 arcminutes, a multiplier of 1.0, an adjusted base unit of 19.1, and a corresponding base size unit of 32 baseline density-independent pixels. The wearable device 110 may have a viewing distance of 12 inches, a base unit of 19.1 arcminutes, a multiplier of 1.3, an adjusted base unit of 24.83, and a corresponding base size unit of 14 baseline density-independent pixels. A mobile device may have a viewing distance of 18 inches, a base unit of 19.1 arcminutes, a multiplier of 1.0, an adjusted base unit of 19.1, and a corresponding base size unit of 16 baseline density-independent pixels.

Due to the consistent base unit of 19.1 arcminutes and the calculated base size unit corresponding to each device and its intended viewing distance, the base size unit when rendered at a device and viewed from the viewing distance may appear that same to the user. As a result, content and/or user interfaces can be generated for, and presented at, devices regardless of the operating system and certain other features of the device. By specifying a viewing-distance-independent base unit, embodiments use relative scales to generate values for user interface elements such as grid, spacing ramp, and type ramp for any device.

Embodiments of the disclosure include systems and methods for using viewing distances and (optionally) display size to generate user interface characteristics or parameters, such as grids, typography, spacing, layout, and so forth, across any number of devices regardless of operating system and/or manufacturer.

This disclosure relates to, among other things, devices, systems, methods, computer-readable media, techniques, and methodologies for device agnostic user interface generation. Certain embodiments manage generation or determination of user interface type based at least in part on device characteristics.

Example embodiments of the disclosure provide a number of technical features or technical effects. For example, in accordance with example embodiments of the disclosure, certain embodiments of the disclosure may generate user interfaces regardless of a particular device that is requesting the user interface and its particular operating system. As a result of improved functionality, user interface functionality may be adapted for different modes of interaction and an increased number of devices. Embodiments of the disclosure may improve computing efficiency and bandwidth by managing content that is sent to devices in accordance with a user interface. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
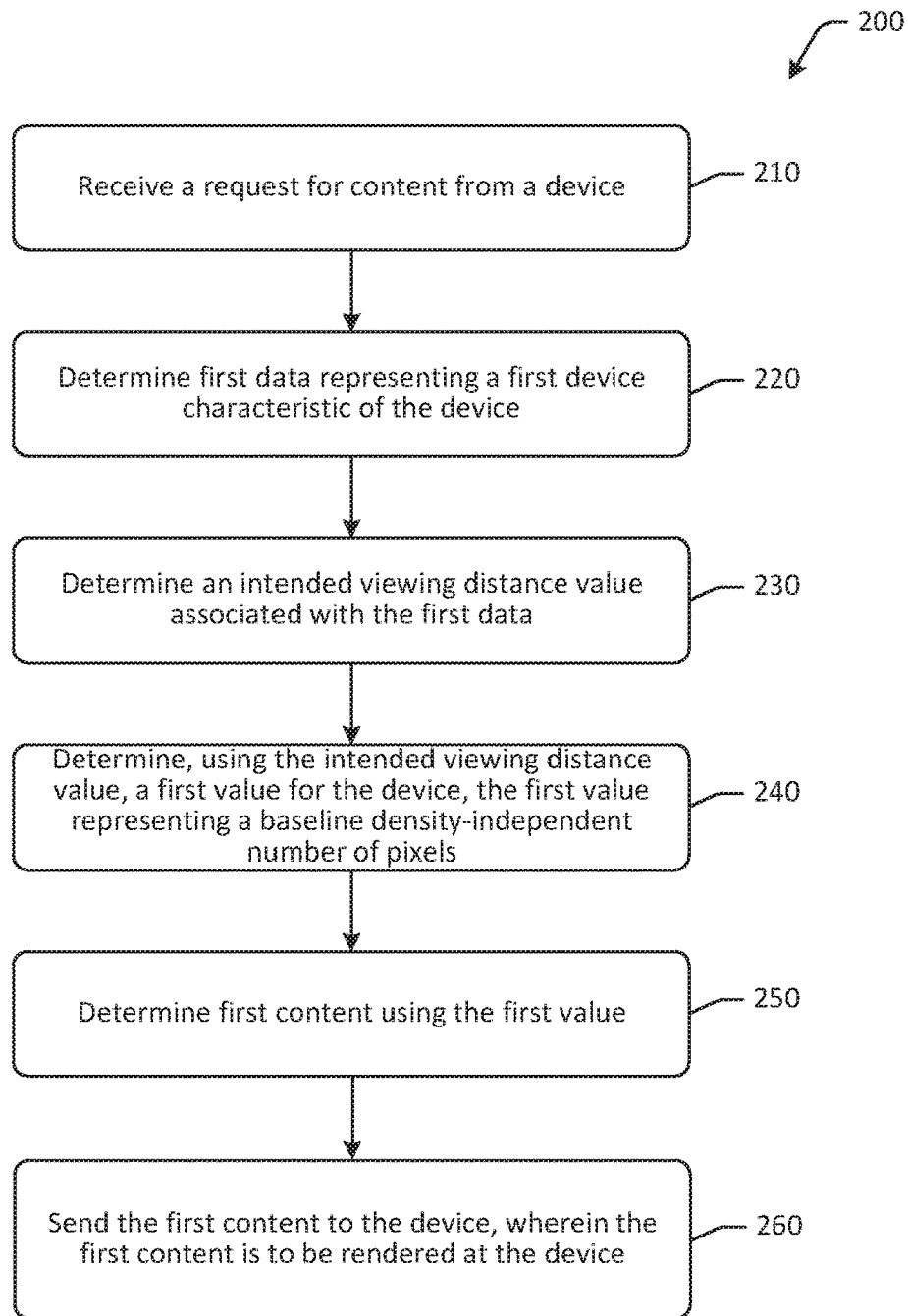
FIG. 2 is a schematic illustration of an example process flow for device agnostic user interface generation in accordance with one or more example embodiments of the disclosure.

FIG. 2 is a schematic illustration of an example process flow 200 for device agnostic user interface generation in accordance with one or more example embodiments of the disclosure. Although example embodiments of the disclosure may be described in the context of user interfaces and certain example devices, it should be appreciated that the disclosure is more broadly applicable to any suitable user interfaces and electronic devices. Some or all of the blocks of the process flows in this disclosure may be performed in a distributed manner across any number of devices. The operations of the process flow 200 may be optional and may be performed in a different order.

At block 210 of the process flow 200, computer-executable instructions stored on memory of a device, such as one or more servers or a user device, may be executed to receive a request for content from a device. For example, one or more communication modules at a remote server may receive a request for content from a device. The device may be an electronic device with a display configured to present content. The request for content may be a request for content from a particular source in one example. For example, the device may be requesting content to present at a certain webpage, or in a certain browser or application window. Content may include text, images, video, audio, or any other suitable forms of content for presentation at the device.

In some embodiments, the request from the device may include metadata, whereas in other embodiments, the device may send metadata separately from the request. The metadata may include data related to the device, such as device characteristics. For example, the metadata may include one or more of a device identifier, display information (e.g., display size, functionality, etc.), device operating mode (e.g., docked mode vs. undocked mode, touch input mode vs. voice input mode, etc.), display orientation (e.g., portrait, landscape, etc.), display resolution, available input types at the device (e.g., touch, voice, remote controller/cursor, five-way input, keyboard, etc.), and/or other data. The metadata may be used by the server to generate a user interface for the device, such as by determining content for presentation at the device and determining a content layout for the content at the device.

In other embodiments, the device may send a device identifier to the server, either in association with the request for content or separately. The server may receive the device identifier, and may determine data associated with the device using a database query. For example, the device identifier may be stored in association with data associated with the device (e.g., display information, available device operating modes, available display orientations, display resolution, available input types at the device (e.g., touch, voice, remote controller/cursor, five-way input, keyboard, etc.), and/or other data) in a table or database. For example, a device may be associated with a device profile or a viewport profile that combine a device operating mode, display shape (e.g., rectangular, round, square, etc.), viewport or display size, display orientation, and viewing distance. The server may therefore determine static features of the device that can be used to generate a user interface. The server may then receive (in some instance by querying the device) data related to dynamic features of the device, such as current operating mode, current display orientation, currently active input type, and so forth.

At block 220 of the process flow 200, computer-executable instructions stored on memory of a device, such as one or more servers or a user device, may be executed to determine first data representing a first device characteristic of the device. For example, one or more user interface generation modules at a remote server may determine first data representing a first device characteristic of the device.

The server may, in some instances, receive the first data from the device in association with the request or in a separate communication. In other instances, the server may determine the first data by querying a lookup table or database using a device identifier for the device. The first data may include data regarding features and context of the device, and may not necessarily include operating system information. Using the first data, the server may be configured to generate a user interface, regardless of the type of device, the manufacturer of the device, the operating system executing on the device, and/or other features.

For example, the first data may include an operating mode identifier that represents an operating mode that is active at the device. For example, some devices may be configured to operate in an undocked mode (e.g., such as a mobile device that a user can hold and primarily use touch to interact with the device, etc.) and a docked mode (e.g., such as the same mobile device that is docked at a docking station and a user may primarily use voice to interact with the device, etc.). In another example, devices may be configured to operate in a personal mode (e.g., with personalized user display settings, etc.) and a communal mode (e.g., with default display settings, etc.). In different operating modes, the device may have different content layouts and/or functionality (e.g., different user interface navigation functionality that may change based at least in part on the first device input type, etc.). The first data may therefore include an operating mode identifier that represents the active operating mode at the device.

In another example, the first data may include a set of available input type identifiers that represent the device input types that are available at the device. Device input types may be used by users to interact with the device. The types of input devices available for use with the device may affect the type of content and/or the content layout of content that is presented at the device. In addition, available input types and/or an active input type (e.g., a most recently used input type) may change as a user uses a device. For example, a television device may be compatible with input types of voice, cursor, and five-way input, of which cursor and five-way input may be available (e.g., voice may be unavailable because a voice-based device is not currently connected to the television device, etc.). In another example, a personal computer may be compatible with input types of touch, voice, keyboard, and cursor. An active input type may be an input type that was most recently used to interact with a device. Although devices may be compatible with more than one input type, and more than one input type may be available for use, the most recent input type may be used to determine an active input type for the device. Because different input devices may have different manners of interaction with the user, the content and/or content layout corresponding to different input types may change due not only to the granularity of control (e.g., cursor may be more granular than voice, etc.), but also because an implied viewing distance may change based on input type in some instances. For example, if a user is using touch input to interact with a device, the viewing distance for the user may be less than if the user is using voice to interact with the device. As a result of a change in viewing distance, a base size unit for content may change, along with, in some instances, a content layout.

At block 230 of the process flow 200, computer-executable instructions stored on memory of a device, such as one or more servers or a user device, may be executed to determine an intended viewing distance value associated with the first data. For example, one or more user interface generation modules at a remote server may determine an intended viewing distance value associated with the first data. In some embodiments, viewing distance data may be stored in association with one or more device characteristics in a database. The server may determine the intended viewing distance value associated with the particular first device characteristic in the database. In other embodiments, the server may automatically determine the intended viewing distance value based at least in part on data received from, or otherwise associated with, the device, such as device operating mode, display size, input type, and/or other data. The intended viewing distance may be the distance from which the user is likely to be from the device. Intended viewing distances may be different for different devices and may be based at least in part on device characteristics. For example, a viewing distance for a 75" television may be about 120 inches, whereas a viewing distance for a wearable device such as a watch may be about 18 inches. The viewing distance may be used by the server to determine a base size unit for the device and its current context that can be used to present content to the user. The base size unit may be a unit that, when viewed on a specific device from the intended viewing distance, appears the same to the user. For example, a base size unit presented at a wearable watch device when viewed from 18 inches may appear to be the same size as the same base size unit presented at a television when viewed from 120 inches; however, the physical size of the base unit may be different for both the wearable device and the television.

At block 240 of the process flow 200, computer-executable instructions stored on memory of a device, such as one or more servers or a user device, may be executed to determine, using the intended viewing distance value, a first value for the device, the first value representing a baseline density-independent number of pixels. For example, one or more user interface generation modules at a remote server may determine, using the intended viewing distance value, a baseline density-independent value for the device. The baseline density-independent value may be a digital unit representation of the base size unit discussed above. Digital units may be converted to pixels locally at devices at render to accurately render content. Digital units may be independent of device resolution or pixel density, as discussed in detail with respect to FIG. 4. The baseline density-independent value may be a baseline because the baseline density-independent value, when converted to actual pixels and rendered by a device, may appear the same to a user when viewed from the intended viewing distance for a particular device in its current context.

To convert density-independent pixel values to screen pixels by a device, the device may use the following equation: screen pixels=(density-independent pixel value)* (display pixel density/160). For example, on a display having a pixel density of 240 dots per inch, 1 density-independent pixel equals 1.5 physical screen pixels. Use of density-independent pixels may ensure accurate render of user interfaces on different devices and/or displays by adapting user interface design to displays of different density. Density-independent pixel values may be relative to a 160 dots per inch resolution display, so 1 density-independent pixel is equivalent to 1 pixel on a 160 dots per inch resolution display, and equals 2 pixels for a 320 dots per inch resolution display.

At block 250 of the process flow 200, computer-executable instructions stored on memory of a device, such as one or more servers or a user device, may be executed to determine first content using the first value. For example, one or more user interface generation modules at a remote server may determine first content using the baseline density-independent value. To determine the first content, the server may determine the content that a content provider desires to present at the device. In some instances, after determining the baseline density-independent value for the device, the server may determine the first content by requesting certain content from a content provider, or by determining content otherwise available to the server, such as stored in one or more connected databases. By determining the baseline density-independent value for the device, the server may be configured to determine an amount of content that can be presented at the device, as well as, in some embodiments, a content layout for presentation of the first content. For example, if the device has the ability to present videos and audio, and the content provider desires to present audio and video, the server may determine the audio and video content for the first content. If the device has a baseline density-independent value that allows for side-by-side presentation of content, and the content provider desires to present side-by-side images, the server may determine the side-by-side content layout and may determine the images as the first content. Using the baseline density-independent value for the device, the server may determine, based on the content the content provider desires to present, the amount and type of content that is sent to the device for presentation.

In some instances, the content may include images. In such instances, the server may determine or select an image from a set of candidate images that have different densities, where the selection or determination is made based on the display resolution of the presenting device, so as to avoid instances where the image is presented with low resolution.

At block 260 of the process flow 200, computer-executable instructions stored on memory of a device, such as one or more servers or a user device, may be executed to send the first content to the device, wherein the first content is to be rendered at the device. For example, one or more communication modules at a remote server may send the first content to the device, wherein the first content is to be rendered at the device using a number of pixels corresponding to the baseline density-independent value. For example, responsive to the request for content, the server may send the first content to the device. In some embodiments, the server may also send instructions to the device for layout and/or formatting of the first content. The device may receive the first content, and may render the first content using a number of pixels that correspond to the baseline density-independent value, so as to render an accurate representation of the first content regardless of the display resolution of the device, as discussed above. In some embodiments, the server may send a set of content identifiers for the first content that is to be rendered in a user interface at the device. In some embodiments, content layout may also be determined by the server, such as based at least in part on a set of available input types, an active input type (e.g., a currently used or most recently used input type), a current operating mode, a current display orientation, and so forth.

The baseline density-independent value for the device, when rendered as a base unit by the device, may have an arcminute measurement of greater than or equal to about 19 and less than or equal to about 25, such as 19.1. Accordingly, a single text character, for example, may have an arcminute measurement of 19.1 when rendered at the device and viewed from the intended viewing distance. As a result, the content when rendered by any device, may take the same amount of field of view of the user or viewer when viewed from the corresponding viewing distance for the device.

Accordingly, the process flow 200 may be used to generate user interfaces for any number of different devices with any number of different display types and device characteristics, including devices with different operating systems, as well as devices that with dynamic operating modes. For example, in instances where a dynamic device characteristic, such as operating mode, active input type, or display orientation, changes after initial presentation of content, the device may send an updated notification to the server indicating the change, and the server may determine whether any changes to the content and/or user interface layout are needed, and if so, may generate the updated user interface and send to the device.

FIGS. 3A-3D are schematic illustrations of example use cases for device agnostic user interface generation with different content and layouts in accordance with one or more example embodiments of the disclosure. Although the examples of FIGS. 3A-3D illustrate certain devices and content layouts, it is understood that embodiments of the disclosure may be used to generate user interfaces for any number of devices regardless of operating system.

Figure 3A:
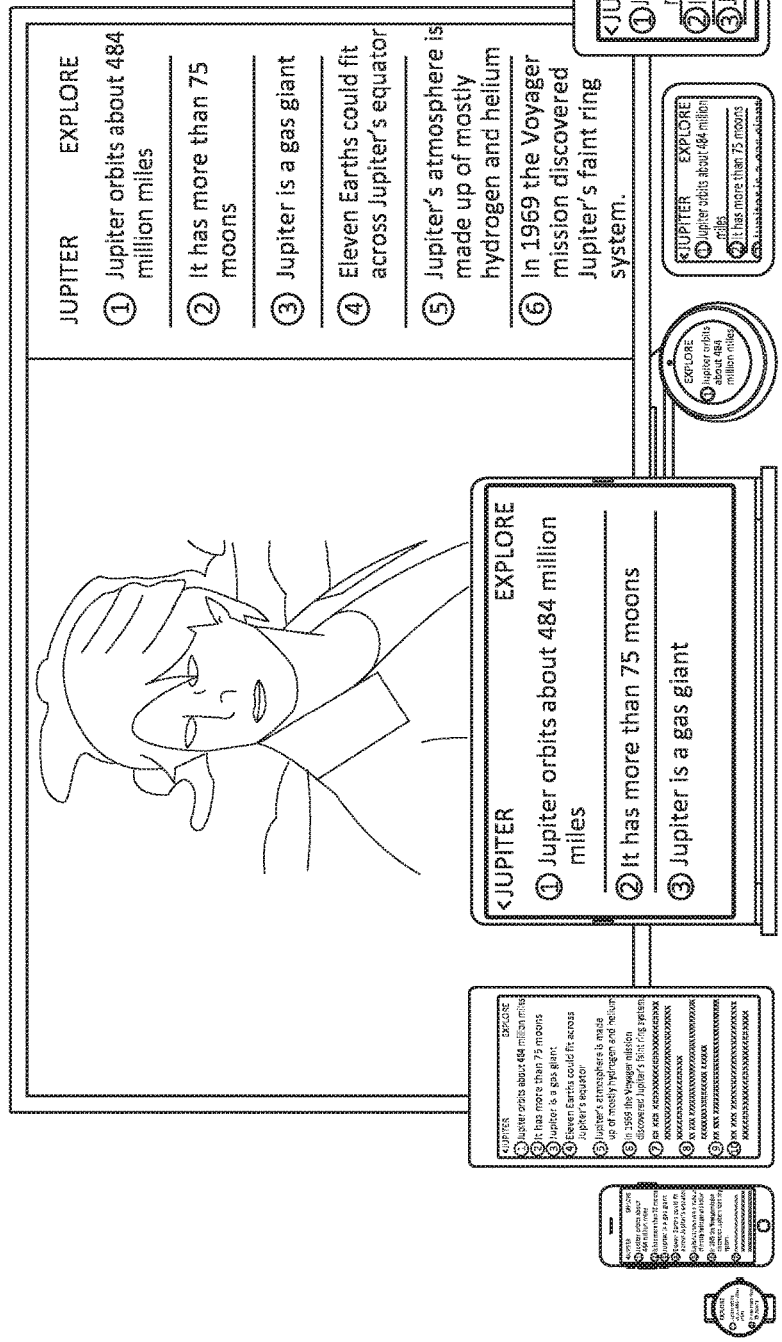
FIGS. 3A-3D are schematic illustrations of example use cases for device agnostic user interface generation with different content and layouts in accordance with one or more example embodiments of the disclosure.

In FIG. 3A, a first use case 300 illustrates user interfaces for the same content presented at a number of different devices. Embodiments of the disclosure may be used to generate the specific user interfaces for each of the illustrated devices using characteristics of the device, regardless of the type of device or the respective operating systems. For example, each of the devices illustrated in FIGS. 3A-3D may have different operating systems, yet embodiments of the disclosure may nonetheless generate user interfaces accordingly. As a result, developers and/or content providers may not have to design for individual devices or operating systems, due to the ability to generate device-agnostic user interfaces.

In FIG. 3A, a number of devices are illustrated. Each of the devices may be presenting the same content. For example, a content provider may desire to present certain content, which may include text content. However, not all of the devices may be able to present all of the text, due to any number of factors, including display size, operating mode, and so forth. Nonetheless, a remote server as described herein may generate a user interface that can be rendered by each individual device using device characteristics and intended viewing distance.

For example, a wearable device may include a first amount of the desired text, a smartphone may include a second amount of the desired text, a tablet may include a third amount of the desired text, a laptop may include a fourth amount of the desired text, and may also include different navigation functionality than the other devices, a round device may include a fifth amount of text, a landscape mode tablet of a first size may include a seventh amount of text, and a landscape mode table of a second size may include an eighth amount of text with different navigation functionality. The television, however, may include not only the desired text, but may be formatted in a partial overlay content layout, such that the previously presented content can continue to be presented at the remainder of the display. This is because the amount of display size needed to present the desired content would not need the entire display or else the text may appear very large and difficult to read. As a result of using arcminutes, the content presented at the television on the partial overlay may appear the same as that presented at the smartphone when viewed at the intended viewing distance.

Figure 3B:
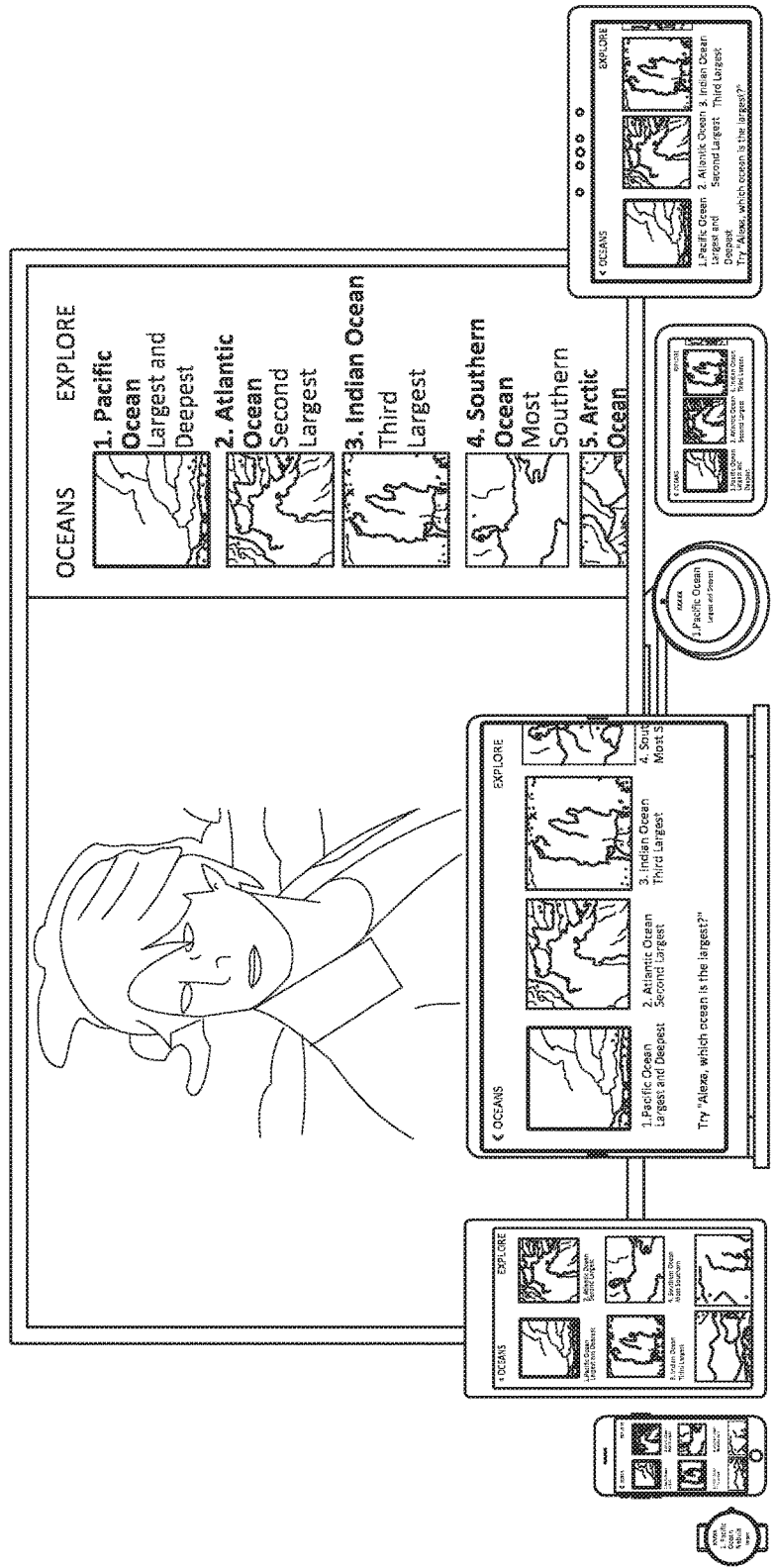

In FIG. 3B, a second use case 310 illustrates the same devices. However, in this use case, the content provider may desire to present content that includes images and text. Embodiments of the disclosure may therefore determine, for each individual device, the amount of content that can be presented at each device, including whether images can be presented, as well as a layout of the content. For example, the wearable device may not present any images, the smartphone may present images of a first size, and the tablet may present images of a second size. The laptop may present the same images and text in a different layout, and the round device may not include images. The television may include the images and content in the partial overlay, while the previously presented content continues to be presented at the remainder of the display.

Figure 3C:
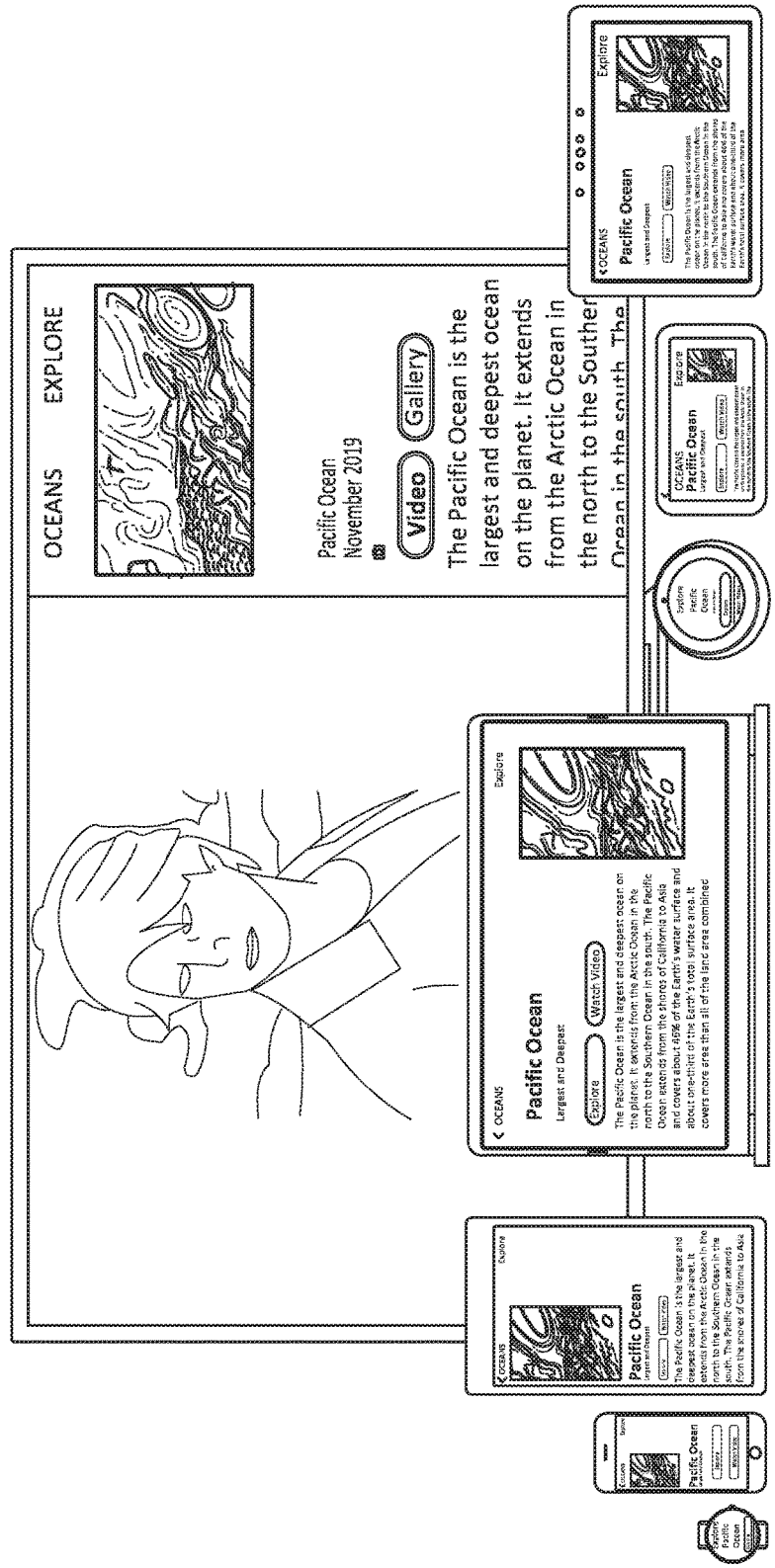

In FIG. 3C, a third use case 320 illustrates the same devices. However, in this use case, the content provider may desire to present detailed content that includes image and text. Embodiments of the disclosure may therefore determine, for each individual device, the amount of content that can be presented at each device, including whether images can be presented, as well as a layout of the content. For example, the wearable device may not present any images, the smartphone may present the image with a first size, and the tablet may present the image of a second size. The laptop may present the same image and text in a different layout, and the round device may not include images. The television may include the image and content in the partial overlay, while the previously presented content continues to be presented at the remainder of the display. User interface options, such as a selectable element to watch a video or view a gallery, may or may not be presented at the respective user interfaces.

Figure 3D:
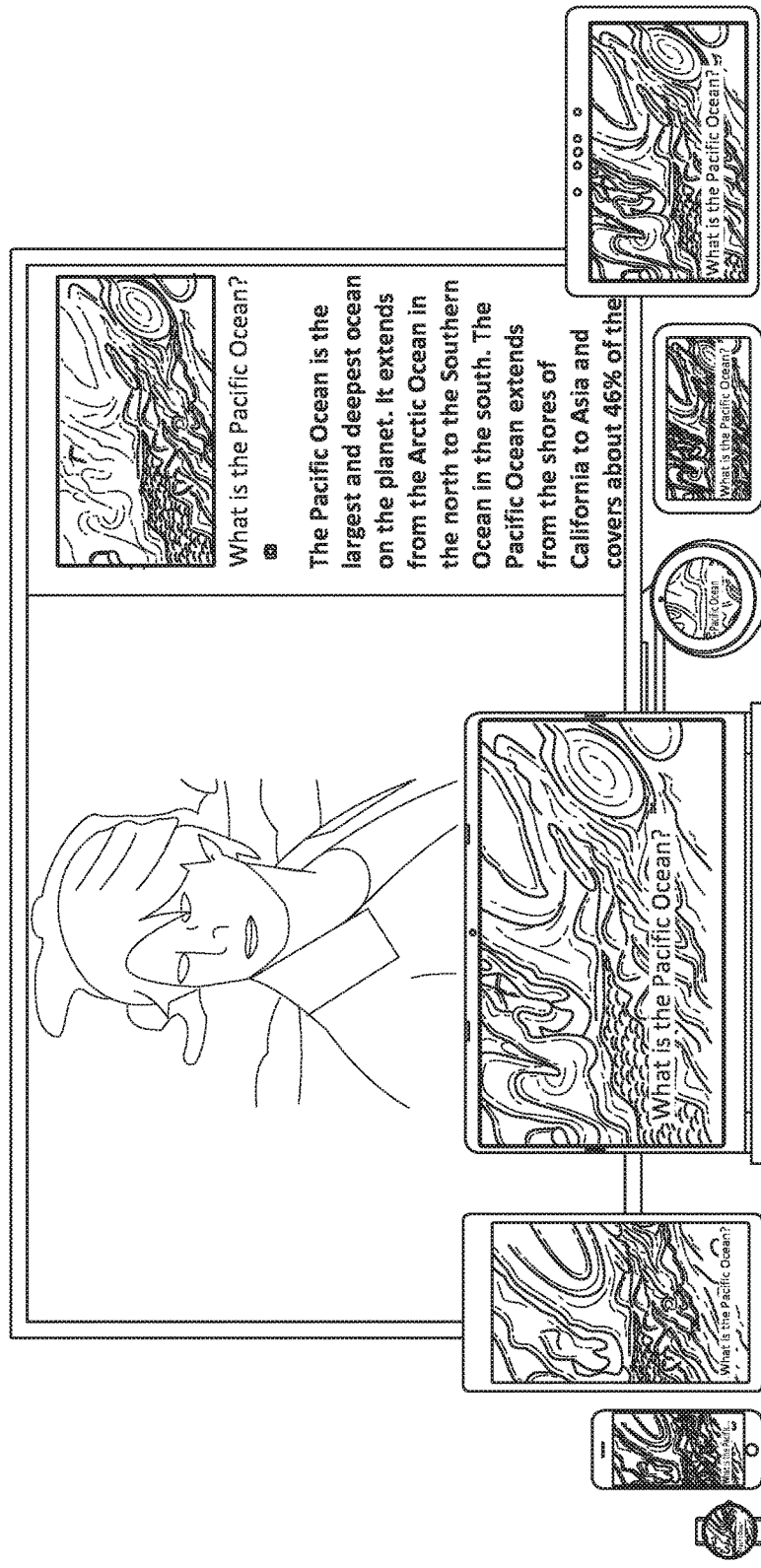

In FIG. 3D, a fourth use case 330 illustrates the same devices. However, in this use case, the content provider may desire to present a video, responsive to a user selecting a watch a video option in FIG. 3C. Embodiments of the disclosure may therefore determine, for each individual device, the amount of content that can be presented at each device, including whether videos can be presented, as well as a layout of the content. For example, each of the devices may present the video content, and some may include text that identifies the video. However, in addition to the video, the television may present additional text as a result of having additional space. Accordingly, user interfaces for each of the devices may be generated and presented at the respective devices regardless of the device operating system.

In addition, certain embodiments may determine the same content for presentation at devices that have the same input type, but different operating systems. For example, in FIG. 3D, the smartphone and the tablet may have different operating systems, but may have the same primary input type of touch input. A server may receive a request for content for presentation at from the smartphone (executing a first operating system) and a second device, such as the tablet (executing a second operating system). The server may determine that a device input type, such as touch input, is an active device input type at the second device. The server may determine that a second intended viewing distance value associated with the touch input type is equal to the intended viewing distance value for the wearable watch. The server may determine the baseline density-independent value, and may determine the first content for presentation at the second device using the baseline density-independent value, such that both devices present the same content.

Figure 4:
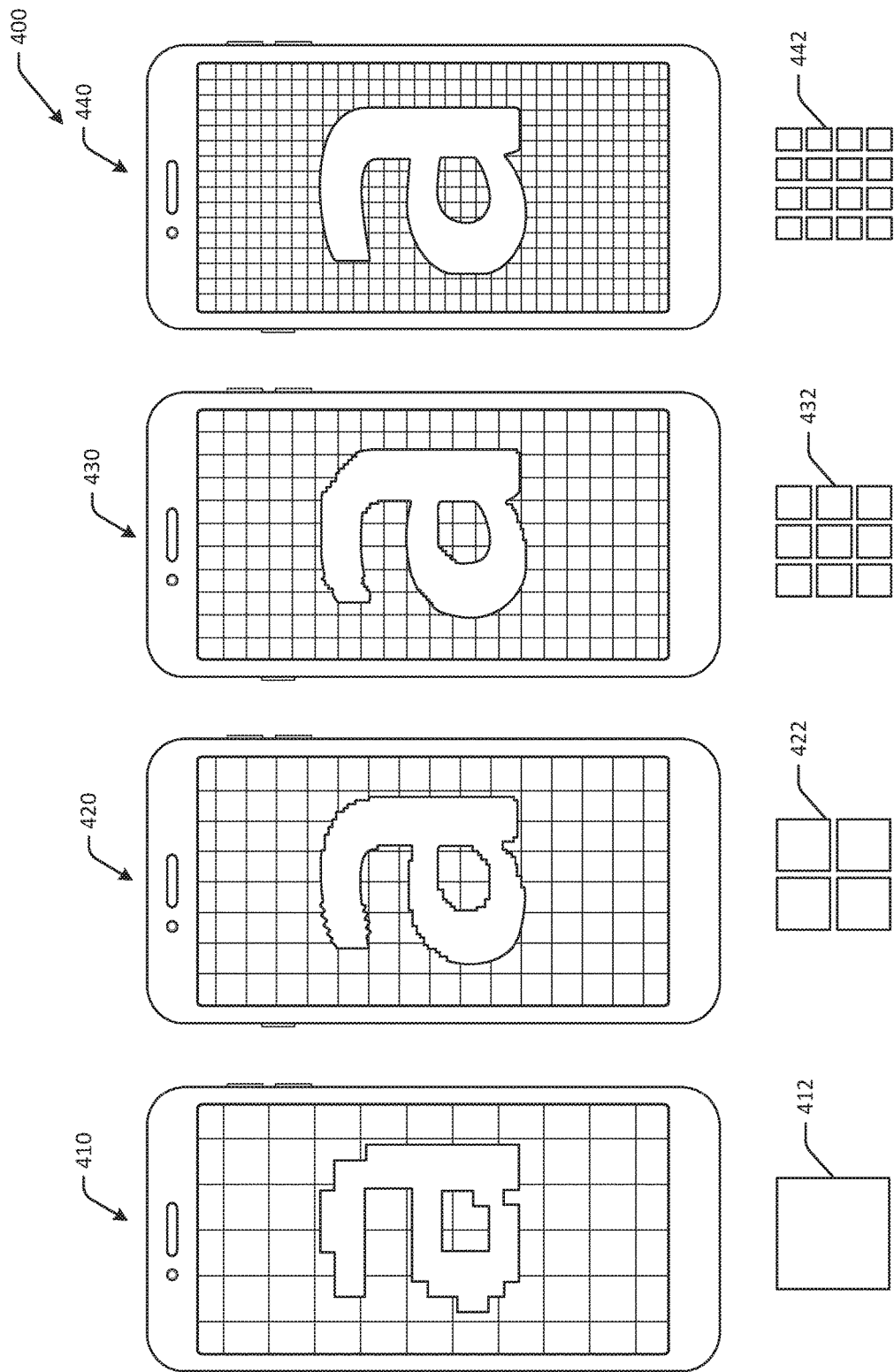
FIG. 4 is a schematic illustration of an example use case for content selection and base size unit determination in accordance with one or more example embodiments of the disclosure.

FIG. 4 is a schematic illustration of an example use case 400 for content selection and base size unit determination in accordance with one or more example embodiments of the disclosure. Although discussed in the context of smartphones, other devices may be used.

Display resolution or density may be a device characteristic that can be used by a server to determine which version of content, such as an image, should be selected for presentation at the device. Display density may be defined by the display resolution and the physical display size. Density may be used to ensure that devices with the same display size and different densities render the same experience. Density-independent pixels can be used to avoid such issues in some instances, as discussed with respect to FIG. 2.

In FIG. 4, a first device 410 may have a density of 320 pixels by 480 pixels, a second device 420 may have a density of 640 pixels by 960 pixels, a third device 430 may have a density of 960 pixels by 1440 pixels, and a fourth device 440 may have a density of 1280 pixels by 1920 pixels. Because a density-independent pixel display size is 320 by 480, one density-independent pixel for the first device 410 may equal one pixel 412, one density-independent pixel for the second device 420 may equal two pixels 422, one density-independent pixel for the third device 430 may equal three pixels 432, and one density-independent pixel for the fourth device 440 may equal four pixels 442.

In addition, selection of images may be determined using the display resolution. For example, the server may determine a set of candidate images, where each image in the set of candidate images has a different resolution. The server may determine or select an image of the set of candidate images that has a resolution that corresponds to the display resolution (e.g., that can be rendered by the display) and may send the image to the device.

In some embodiments, the server may receive a first version of the first content having a first resolution from a content provider server, and may receive a second version of the first content having a second resolution from the content provider server. The server may select the first version of the first content based at least in part on the first baseline density-independent value and the resolution of the display.

Figure 5:
FIG. 5 is a schematic illustration of a universal type ramp in accordance with one or more example embodiments of the disclosure.

FIG. 5 is a schematic illustration of a universal type ramp 500 in accordance with one or more example embodiments of the disclosure. The example of FIG. 5 may be used for any type of electronic device, and may be applicable to textual content that is to be rendered at a device.

The universal type ramp 500 may be a set of type sizes that are selected for text that is to be rendered at a device. A particular type size may be determined for a device based at least in part on the corresponding base size unit for the device. For example, once a base size unit, or baseline density-independent value, is determined for a device, the base size unit may be used to generate a relative scale for type, a relative scale for a user interface grid, and a relative scale for spacing. In some embodiments, after the base size unit is determined, root em (rems), which may be a browser default font size value, may be used to generate a relative scale for type, grid, and spacing.

The universal type ramp 500 includes a set of different type sizes associated with different rem values. For example, a 1.000 rem value may be associated with a medium type size. The 1.000 rem value may be scaled to different type sizes. For example, 1.250 rem may be associated with a large type size, 1.500 rem may be associated with an extra large type size, 2.000 rem may be associated with a 2× large type size, 3.000 rem may be associated with a 3× large type size, 4.000 rem may be associated with a 4× large type size, and 6.000 rem may be associated with a 5× large type size. Smaller sizes relative to 1.000 rem may include 0.875 rem associated with a small type size, and 0.750 associated with an extra small type size. Because the base size unit is adjusted for readability at any viewing distance, the relative type scale maps consistently across device modes with different viewing distances. For devices with multiple viewing distance ranges, part of the type ramp can be calculated from the closer viewing distance range with the remainder calculated from the farther viewing distance range.

To determine font size for text content, a server may determine a root em (rem) multiplier value for the text using the baseline density-independent value for the device. For example, different base size units may be pre-associated with different rem multiplier values in a table, such as a base size unit of 14 density-independent pixel value being associated with 1.000 rem, a base size unit of 32 density-independent pixel value being associated with 2.000 rem, and so forth. The server may send the rem multiplier value to the device, and the device may be configured to determine a product of the rem multiplier value and a root em of the device itself (or executing application) to determine a font size for the text. The rem of the device or an application may be relative to a root html element at a device, not to the parent element. That is, if font size of the root element is 16 pixels then 1.000 rem is 16 pixels for all elements. If font size is not explicitly defined in root element then 1 rem may be equal to the default font size provided by the browser.

For textual spacing and/or content spacing, the server may determine a text spacing multiplier value associated with the rem multiplier value, and may send the text spacing multiplier value to the device. The device may be configured to determine a product of the text spacing multiplier value and the baseline density-independent value to determine spacing between adjacent textual characters.

In some embodiments, text styles may be selected based at least in part on baseline density-independent value and/or viewing distance. For example, the server may determine a set of text styles for a user interface at the device using the intended viewing distance value and/or the baseline density-independent value.

Figure 6:
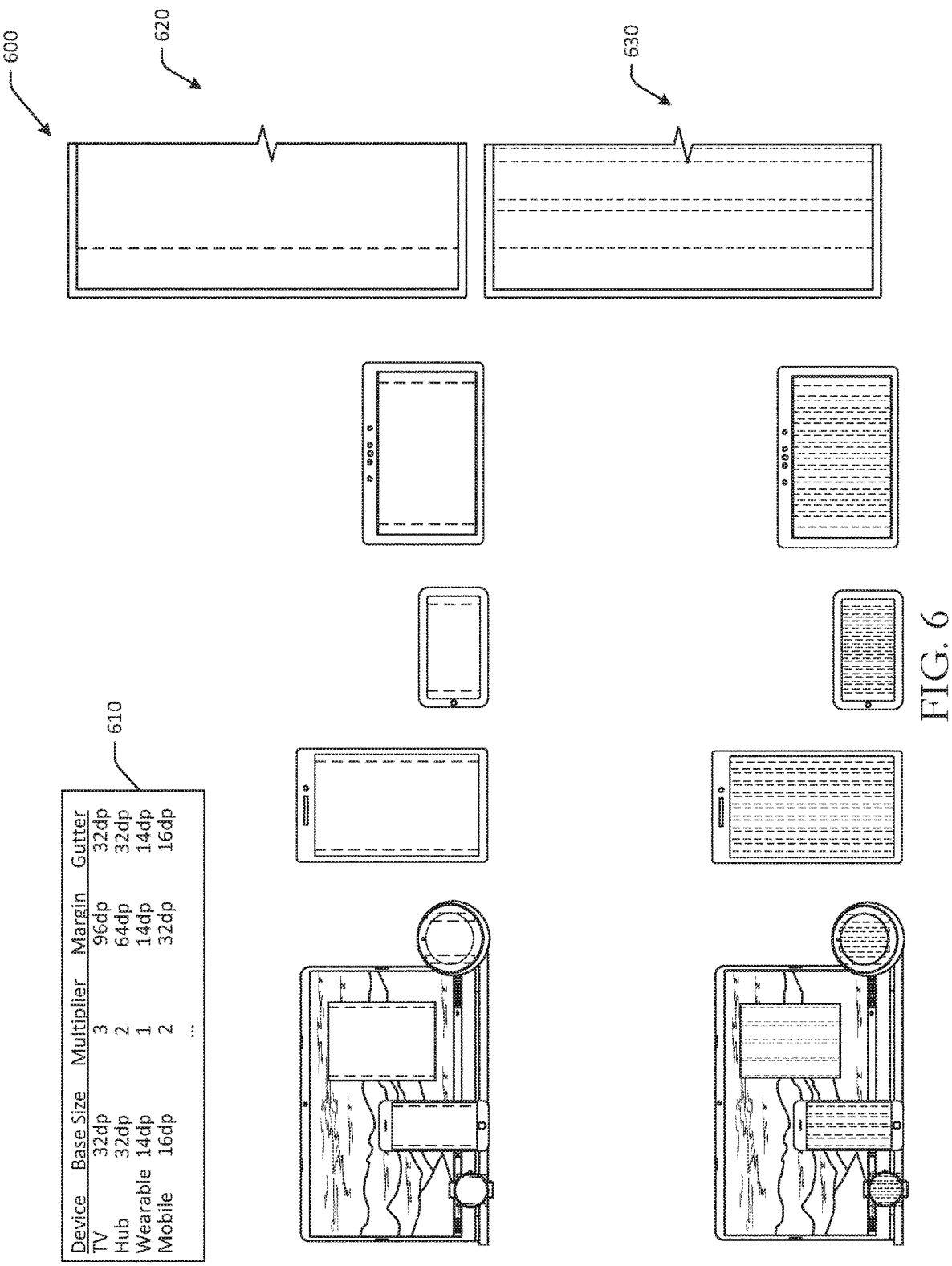
FIG. 6 is a schematic illustration of an example use case for using base size unit to determine various user interface spacing characteristics in accordance with one or more example embodiments of the disclosure.

FIG. 6 is a schematic illustration of an example use case 600 for using base size unit to determine various user interface spacing characteristics in accordance with one or more example embodiments of the disclosure. As discussed with respect to FIG. 6, base size unit is a baseline density-independent value for a particular device, where different devices can have different base size units.

Grids are used to consistently space elements horizontally on a display, and are made up of margins, columns, and gutters. Margins may be defined as left and right edges of a display. Margins may be determined by a combination of viewing distance and display width. Gutter size may be defined as the space between columns. Gutter size may be based on viewing distance, but may not change with display width. For example, gutter size may increase the further away a device is while a user is interacting with it. Spacing is used to consistently space user interface elements and typography (vertically or horizontally) within the display. Spacing sizes are defined for each viewing distance range and may not change with display size. In FIG. 6, a first row 620 depicts sample margins illustrated with dashed lines on a number of devices. A second row 630 depicts sample gutters illustrated with dashed lines on the devices.

To determine margins, gutter sizes, columns, spacing, and so forth, a remote server may first determine a base size unit for a device. For example, a table 610 may be used to determine various grid values for a device. In a first example, a television device may have a base size unit of 32 baseline density-independent pixels, with a multiplier of 3.5.

The multiplier may be an automatically generated or manually determined adjustment to base size unit for readability and/or visibility of content, and may improve aesthetics. The television device may therefore have a margin of 112 baseline density-independent pixels and a gutter size equal to the base size unit of 32 baseline density-independent pixels. A hub device, such as a tablet in docked mode, may have a base size unit of 32 baseline density-independent pixels, a multiplier of 2, a margin of 64 baseline density-independent pixels, and a gutter of 32 baseline density-independent pixels. A wearable device may have a base size unit of 14 baseline density-independent pixels, a multiplier of 1, a margin of 14 baseline density-independent pixels, and a gutter of 14 baseline density-independent pixels. A mobile device may have a base size unit of 16 baseline density-independent pixels, a multiplier of 2, a margin of 32 baseline density-independent pixels, and a gutter of 16 baseline density-independent pixels.

To calculate margin values for a user interface to present at a device, a server may determine a product of a baseline density-independent value for the device and a margin multiplier between 1 and 4 (or another suitable number), where the product is a margin size for a user interface at the device, and where the margin size represents spacing between one or more edges of the user interface and content of the user interface.

To calculate gutter size values for a user interface to present at a device, a server may determine that a gutter size for a user interface at the device is the baseline density-independent value, where the gutter size represents spacing between columns of content at the user interface. A number of columns may be determined based at least in part on a width of the display.

Figure 7:
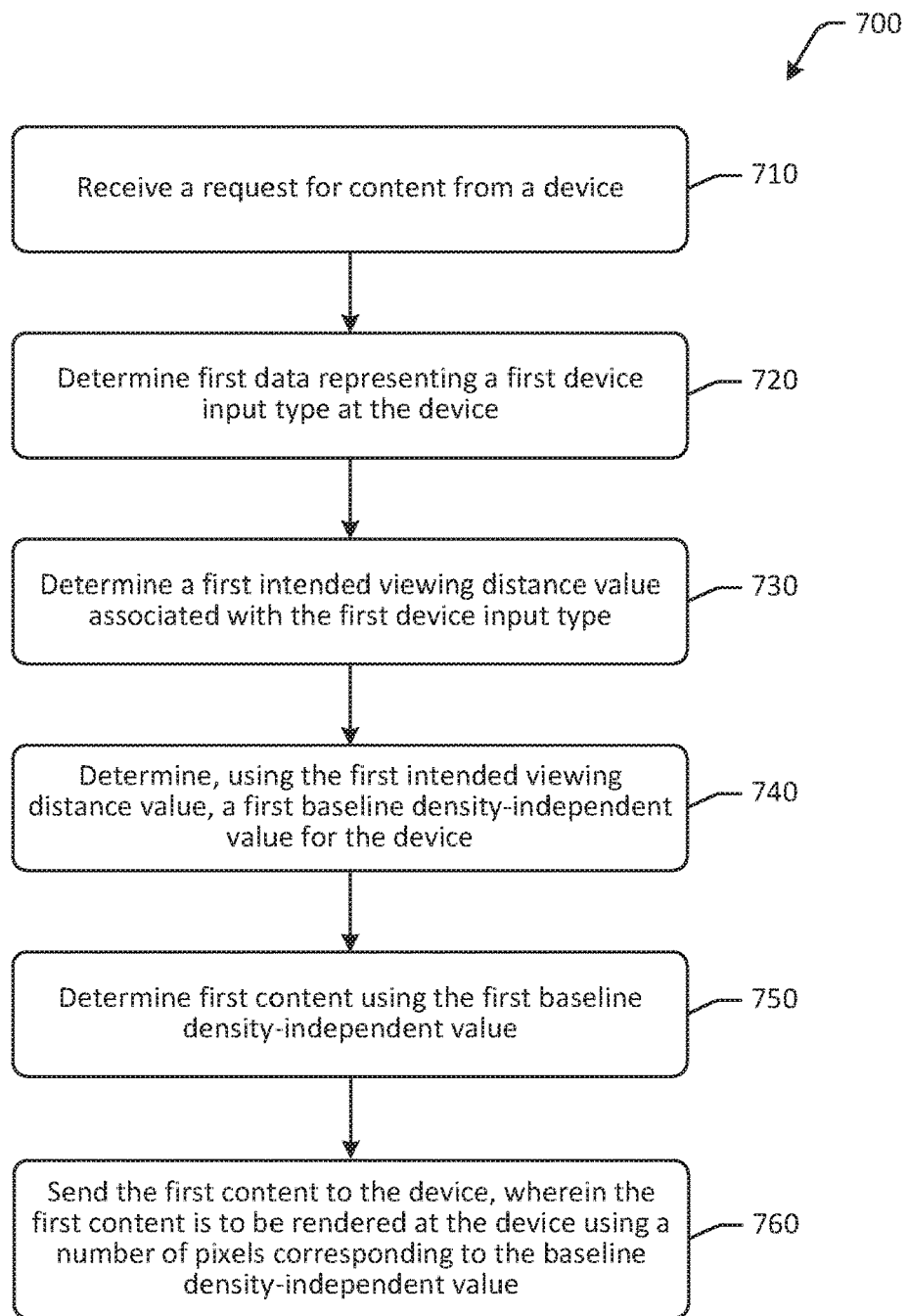
FIG. 7 is a schematic illustration of an example process flow for device agnostic user interface generation based on device input type(s) in accordance with one or more example embodiments of the disclosure.

FIG. 7 is a schematic illustration of an example process flow 700 for device agnostic user interface generation based on device input type(s) in accordance with one or more example embodiments of the disclosure. Although example embodiments of the disclosure may be described in the context of user interfaces and certain example devices, it should be appreciated that the disclosure is more broadly applicable to any suitable user interfaces and electronic devices. Some or all of the blocks of the process flows in this disclosure may be performed in a distributed manner across any number of devices. The operations of the process flow 700 may be optional and may be performed in a different order.

At block 710 of the process flow 700, computer-executable instructions stored on memory of a device, such as one or more servers or a user device, may be executed to receive a request for content from a device. For example, one or more communication modules at a remote server may receive a request for content from a device. The device may be an electronic device with a display configured to present content. The request for content may be a request for content from a particular source in one example. For example, the device may be requesting content to present at a certain webpage, or in a certain browser or application window. Content may include text, images, video, audio, or any other suitable forms of content for presentation at the device.

In some embodiments, the request from the device may include metadata, whereas in other embodiments, the device may send metadata separately from the request. The metadata may include data related to the device, such as device characteristics. For example, the metadata may include one or more of a device identifier, display information (e.g., display size, functionality, etc.), device operating mode (e.g., docked mode vs. undocked mode, touch input mode vs. voice input mode, etc.), display orientation (e.g., portrait, landscape, etc.), display resolution, available input types at the device (e.g., touch, voice, remote controller/cursor, five-way input, keyboard, etc.), and/or other data. The metadata may be used by the server to generate a user interface for the device, such as by determining content for presentation at the device and determining a content layout for the content at the device.

In other embodiments, the device may send a device identifier to the server, either in association with the request for content or separately. The server may receive the device identifier, and may determine data associated with the device using a database query. For example, the device identifier may be stored in association with data associated with the device (e.g., display information, available device operating modes, available display orientations, display resolution, available input types at the device (e.g., touch, voice, remote controller/cursor, five-way input, keyboard, etc.), and/or other data) in a table or database. For example, a device may be associated with a device profile or a viewport profile that combine a device operating mode, display shape (e.g., rectangular, round, square, etc.), viewport or display size, display orientation, and viewing distance. The server may therefore determine static features of the device that can be used to generate a user interface. The server may then receive (in some instance by querying the device) data related to dynamic features of the device, such as current operating mode, current display orientation, currently active input type, and so forth.

At block 720 of the process flow 700, computer-executable instructions stored on memory of a device, such as one or more servers or a user device, may be executed to determine first data representing a first device input type at the device. For example, one or more user interface generation modules at a remote server may determine first data representing a first device input type at the device. The server may, in some instances, receive the first data from the device in association with the request or in a separate communication. In other instances, the server may determine the first data by querying a lookup table or database using a device identifier for the device.

For example, the first data may include a first device input type and/or a set of available input type identifiers that represent the device input types that are available at the device. Device input types may be used by users to interact with the device. The types of input devices available for use with the device may affect the type of content and/or the content layout of content that is presented at the device. In addition, available input types and/or an active input type (e.g., a most recently used input type) may change as a user uses a device. For example, a television device may be compatible with input types of voice, cursor, and five-way input, of which cursor and five-way input may be available (e.g., voice may be unavailable because a voice-based device is not currently connected to the television device, etc.). In another example, a personal computer may be compatible with input types of touch, voice, keyboard, and cursor. An active input type may be an input type that was most recently used to interact with a device. Although devices may be compatible with more than one input type, and more than one input type may be available for use, the most recent input type may be used to determine an active input type for the device. Because different input devices may have different manners of interaction with the user, the content and/or content layout corresponding to different input types may change due not only to the granularity of control (e.g., cursor may be more granular than voice, etc.), but also because an implied viewing distance may change based on input type in some instances. For example, if a user is using touch input to interact with a device, the viewing distance for the user may be less than if the user is using voice to interact with the device. As a result of a change in viewing distance, a base size unit for content may change, along with, in some instances, a content layout.

In some embodiments, the server may determine second data representing a second device input type at the device. For example, the user of the device may interact with the device using a second device input type, and the device may therefore send an indication of the second device input type to the server. The server may determine that the first device input type is a primary device input type, and may generate the user interface for primary navigation and/or consumption with the first device input type. A primary device input type may be predesignated and may be associated with a device operating mode, such as voice for docked devices and touch for undocked devices.

In another example, the server may determine second data representing a second device input type at the device, and may determine that the first device input type is an active device input type. The server may therefore generate the user interface designed for primary interaction using the first device input type.

At block 730 of the process flow 700, computer-executable instructions stored on memory of a device, such as one or more servers or a user device, may be executed to determine an intended viewing distance value associated with the first device input type. For example, one or more user interface generation modules at a remote server may determine an intended viewing distance value associated with the first device input type. In some embodiments, viewing distance data may be stored in association with one or more device input types in a database. The server may determine the intended viewing distance value associated with the particular first device input type in the database. In other embodiments, the server may automatically determine the intended viewing distance value based at least in part on data received from, or otherwise associated with, the device, such as first device input type. The intended viewing distance may be the distance from which the user is likely to be from the device. Intended viewing distances may be different for different devices and may be based at least in part on device characteristics. For example, a viewing distance for a 75" television may be about 120 inches, whereas a viewing distance for a wearable device such as a watch may be about 18 inches. The viewing distance may be used by the server to determine a base size unit for the device and its current context that can be used to present content to the user. The base size unit may be a unit that, when viewed on a specific device from the intended viewing distance, appears the same to the user. For example, a base size unit presented at a wearable watch device when viewed from 18 inches may appear to be the same size as the same base size unit presented at a television when viewed from 120 inches; however, the physical size of the base unit may be different for both the wearable device and the television.

At block 740 of the process flow 700, computer-executable instructions stored on memory of a device, such as one or more servers or a user device, may be executed to determine, using the intended viewing distance value, a first baseline density-independent value for the device. For example, one or more user interface generation modules at a remote server may determine, using the intended viewing distance value, a baseline density-independent value for the device. The baseline density-independent value may be a digital unit representation of the base size unit discussed above. Digital units may be converted to pixels locally at devices at render to accurately render content. Digital units may be independent of device resolution or pixel density, as discussed in detail with respect to FIG. 4. The baseline density-independent value may be a baseline because the baseline density-independent value, when converted to actual pixels and rendered by a device, may appear the same to a user when viewed from the intended viewing distance for a particular device in its current context.

To convert density-independent pixel values to screen pixels by a device, the device may use the following equation: screen pixels=(density-independent pixel value)* (display pixel density/160). For example, on a display having a pixel density of 240 dots per inch, 1 density-independent pixel equals 1.5 physical screen pixels. Use of density-independent pixels may ensure accurate render of user interfaces on different devices and/or displays by adapting user interface design to displays of different density. Density-independent pixel values may be relative to a 160 dots per inch resolution display, so 1 density-independent pixel is equivalent to 1 pixel on a 160 dots per inch resolution display, and equals 2 pixels for a 320 dots per inch resolution display.

At block 750 of the process flow 700, computer-executable instructions stored on memory of a device, such as one or more servers or a user device, may be executed to determine first content using the baseline density-independent value. For example, one or more user interface generation modules at a remote server may determine first content using the baseline density-independent value. To determine the first content, the server may determine the content that a content provider desires to present at the device. In some instances, after determining the baseline density-independent value for the device, the server may determine the first content by requesting certain content from a content provider, or by determining content otherwise available to the server, such as stored in one or more connected databases. By determining the baseline density-independent value for the device, the server may be configured to determine an amount of content that can be presented at the device, as well as, in some embodiments, a content layout for presentation of the first content. For example, if the device has the ability to present videos and audio, and the content provider desires to present audio and video, the server may determine the audio and video content for the first content. If the device has a baseline density-independent value that allows for side-by-side presentation of content, and the content provider desires to present side-by-side images, the server may determine the side-by-side content layout and may determine the images as the first content. Using the baseline density-independent value for the device, the server may determine, based on the content the content provider desires to present, the amount and type of content that is sent to the device for presentation.

In some instances, the content may include images. In such instances, the server may determine or select an image from a set of candidate images that have different densities, where the selection or determination is made based on the display resolution of the presenting device, so as to avoid instances where the image is presented with low resolution.

At block 760 of the process flow 700, computer-executable instructions stored on memory of a device, such as one or more servers or a user device, may be executed to send the first content to the device, wherein the first content is to be rendered at the device using a number of pixels corresponding to the baseline density-independent value. For example, one or more communication modules at a remote server may send the first content to the device, wherein the first content is to be rendered at the device using a number of pixels corresponding to the baseline density-independent value. For example, responsive to the request for content, the server may send the first content to the device. In some embodiments, the server may also send instructions to the device for layout and/or formatting of the first content. The device may receive the first content, and may render the first content using a number of pixels that correspond to the baseline density-independent value, so as to render an accurate representation of the first content regardless of the display resolution of the device, as discussed above. In some embodiments, the server may send a set of content identifiers for the first content that is to be rendered in a user interface at the device. In some embodiments, content layout may also be determined by the server, such as based at least in part on a set of available input types, an active input type (e.g., a currently used or most recently used input type), a current operating mode, a current display orientation, and so forth.

The baseline density-independent value for the device, when rendered as a base unit by the device, may have an arcminute measurement of greater than or equal to about 19 and less than or equal to about 25, such as 19.1. Accordingly, a single text character, for example, may have an arcminute measurement of 19.1 when rendered at the device and viewed from the intended viewing distance. An arcminute is a unit of angular measurement equal to $\frac{1}{60}$ of one degree. Since one degree is $\frac{1}{360}$ of a complete rotation, one minute of arc is $\frac{1}{21600}$ of a complete rotation. As a result, the content when rendered by any device, may take the same amount of field of view of the user or viewer when viewed from the corresponding viewing distance for the device.

Accordingly, the process flow 700 may be used to generate user interfaces for any number of different devices with any number of different display types and device characteristics, including devices with different operating systems and device input types, as well as devices that with dynamic operating modes. For example, in instances where a dynamic device characteristic, such as operating mode, active input type, or display orientation, changes after initial presentation of content, the device may send an updated notification to the server indicating the change, and the server may determine whether any changes to the content and/or user interface layout are needed, and if so, may generate the updated user interface and send to the device.

Figure 8:
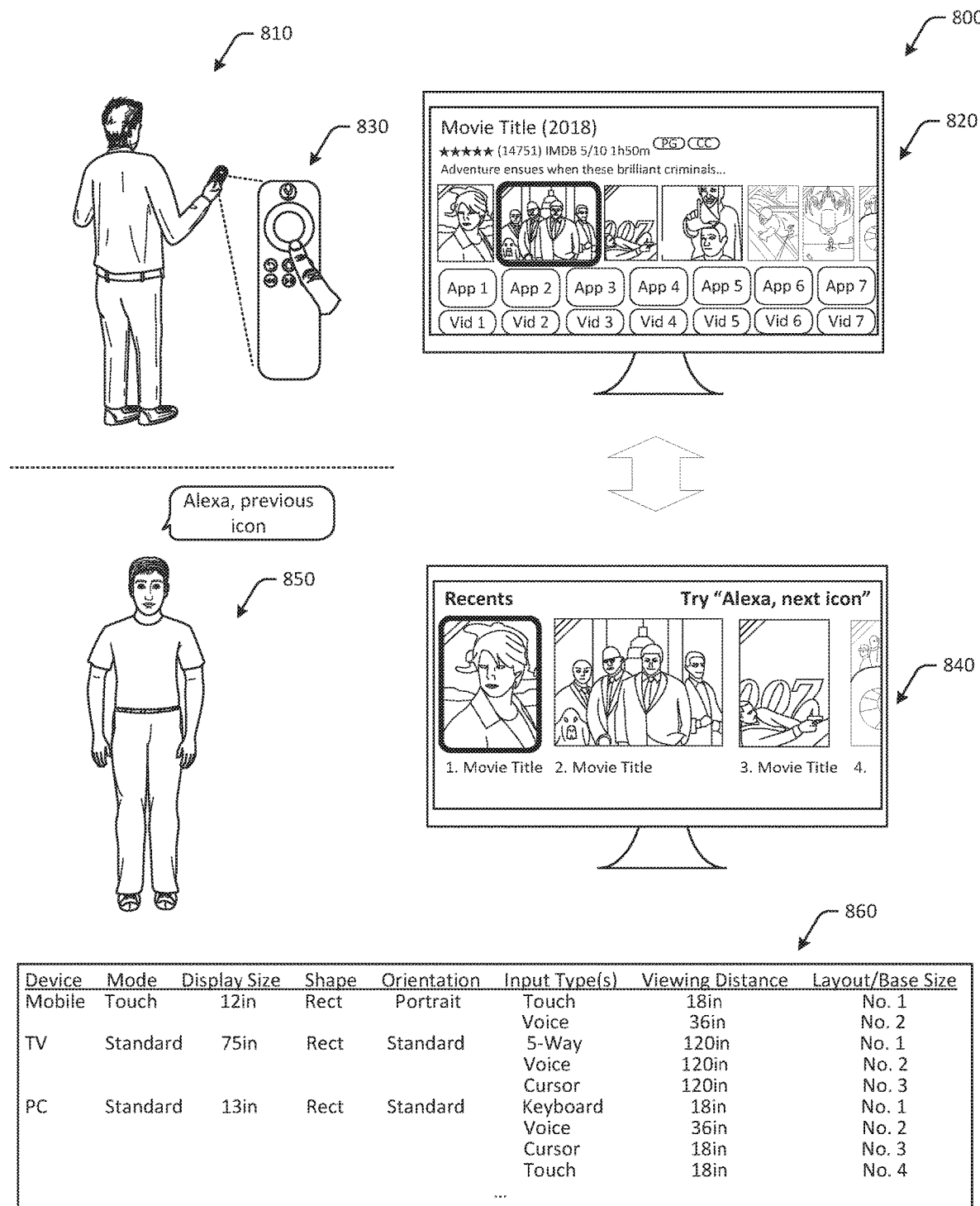
FIG. 8 is a schematic illustration of example user interface generation based on device input type(s) in accordance with one or more example embodiments of the disclosure.

FIG. 8 is a schematic illustration of example user interface generation based on device input type(s) in accordance with one or more example embodiments of the disclosure. Users may interact with digital content in different manners at different times or during the course of a content consumption session. For example, users may navigate user interfaces via voice input and then may later navigate using a remote control. In some embodiments, aspects of user interfaces, such as the content presented, the type of content presented, and content layout may be dynamically modified based at least in part on a most recent device input type.

For example, in FIG. 8, a user at a first instance 810 may interact with a near television 820 using a remote control 830. The user may use the direction pad, scroll wheel, or other control device of the remote control 830 to navigate the available options at the user interface presented at the television 820. However, if the user at a second instance 850 interacts with the television 820 using a voice input, such as "Alexa, previous icon," or "Alexa, scroll down," the user interface may be modified to include the same content but having a different layout and content density.

Similarly, if the user reverts back to using the remote control 830, the user interface type may be modified again. As a result, the user interface that is currently presented may be determined using the most recent device input type.

In an embodiment, a server may receive a request for content for presentation at a first device executing a first operating system, such as the television 820. The request may be associated with a first device identifier, a first device input type available at the first device, such as voice, and a second device input type available at the first device, such as remote control or another cursor. The server may determine that the first device input type is an active device input type, where an active device input type is the most recently used device input type. The server may determine a first intended viewing distance value associated with the first device input type, where the first intended viewing distance value is a distance from which a user is to view a display of the first device. The server may determine a baseline density-independent value associated with the first intended viewing distance value, where the baseline density-independent value is converted to a number of pixels by the first device, and where the number of pixels has an arcminute value of about 19 when viewed by a user from the first intended viewing distance. The server may determine first content for presentation at the first device using the baseline density-independent value, and may select a first content layout for the first content using the first device input type. The server may send the first content to the first device for presentation, where the first content is to be rendered at the first device using a number of pixels determined using the baseline density-independent value, and may cause the first device to render the first content using the first content layout.

If the user switches to a different device input type, or another device input type becomes active, the server may receive an indication that the second device input type is the active device input type, and may determine a second intended viewing distance value associated with second device input type. The server may determine a second baseline density-independent value associated with the second intended viewing distance value, where the second baseline density-independent value is converted to a number of pixels by the first device, and where the number of pixels has an arcminute value of about 19 when viewed by a user from the second intended viewing distance. The server may determine second content for presentation at the first device using the second baseline density-independent value, and may select a second content layout for the second content using the second device input type. The server may send the second content to the first device for presentation, and may cause the first device to render the second content using the second content layout. In some embodiments, the amount of content included in a user interface may change based at least in part on the active device input type, as illustrated in FIG. 8.

Similarly, the server may use a device operating mode to determine content layout. For example, the server may receive an indication of a first operating mode from a device. The server may determine a first content layout for a user interface at the device using the first operating mode. The server may then receive an indication from the device representing a change in operating mode from the first operating mode to a second operating mode. The server may determine a second content layout for the user interface at the device using the second operating mode. A first position of the first content in the first content layout may be different than a second position of the first content in the second content layout, as illustrated in FIG. 8.

Content layout may also be determined based at least in part on available and/or active device input types. For example, the server may determine a first content layout for the device associated with the first device input type, and may cause the device to present the first content using the first content layout. In another example, the server may determine data representing a second device input type at the device (where the second data is determined after the first data), and may determine a second intended viewing distance value associated with the second device input type. The server may determine, using the second intended viewing distance value, a second baseline density-independent value for the device, and may determine second content using the second baseline density-independent value. The server may determine a second content layout for the device associated with the second device input type, and may cause the device to present the first content using the second content layout.

One or more operations of the methods, process flows, or use cases of FIGS. 1-8 may have been described above as being performed by a user device, or more specifically, by one or more program module(s), applications, or the like executing on a device. It should be appreciated, however, that any of the operations of the methods, process flows, or use cases of FIGS. 1-8 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-8 may be described in the context of the illustrative devices, it should be appreciated that such operations may be implemented in connection with numerous other device configurations.

The operations described and depicted in the illustrative methods, process flows, and use cases of FIGS. 1-8 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 9:
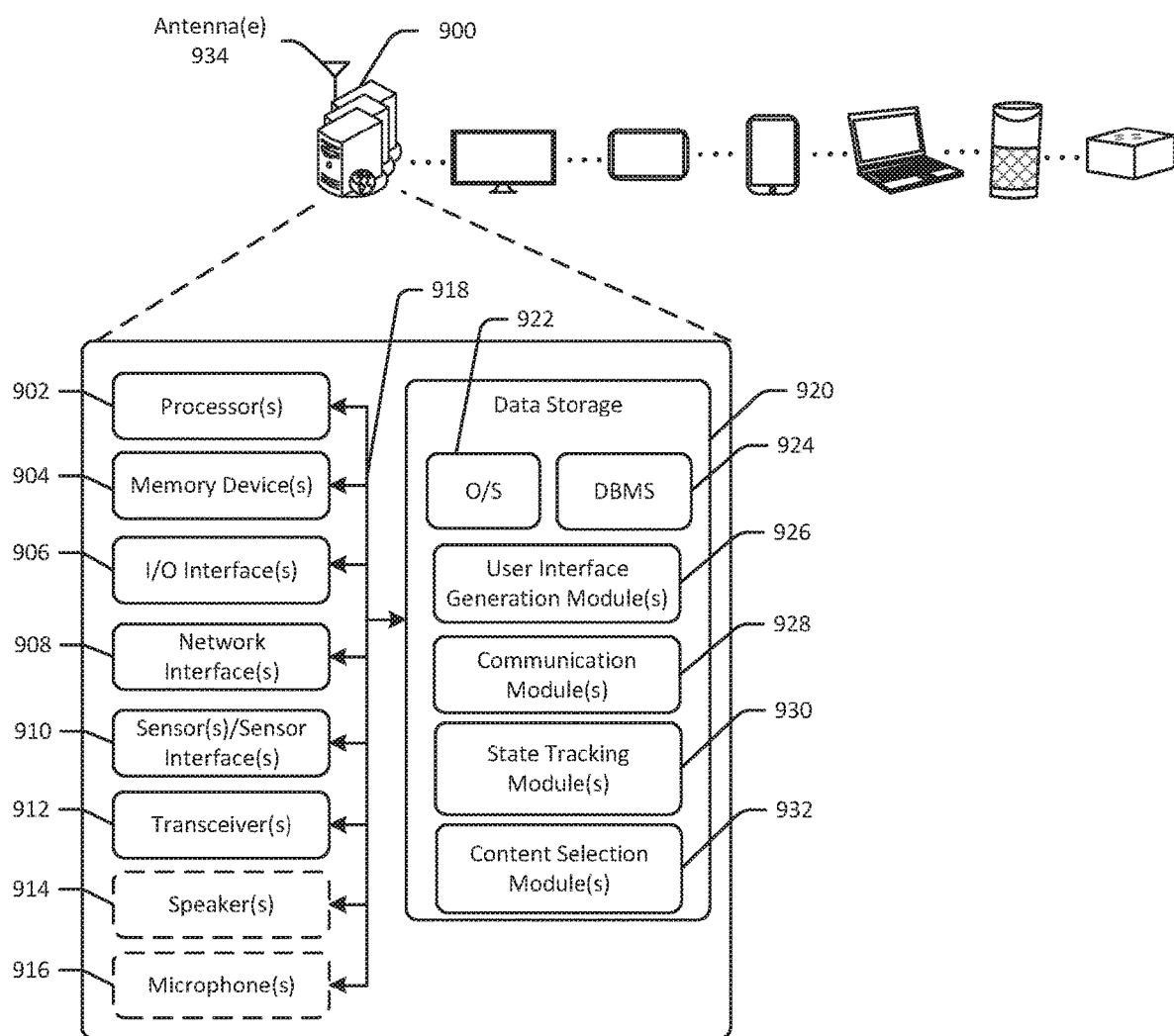
FIG. 9 is a schematic block diagram of an illustrative server in accordance with one or more example embodiments of the disclosure.

FIG. 9 is a schematic block diagram of an illustrative server 900 in accordance with one or more example embodiments of the disclosure. The device 900 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The device 900 may correspond to an illustrative device configuration for the user devices of FIGS. 1-8 (e.g. remote server, server(s), etc.).

The device 900 may be configured to communicate via one or more networks with one or more servers, user devices, or the like. In some embodiments, a single device or single group of devices may be configured to perform more than one type of user interface generation functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the device 900 may include one or more processors (processor(s)) 902, one or more memory devices 904 (generically referred to herein as memory 904), one or more input/output (I/O) interface(s) 906, one or more network interface(s) 908, one or more sensors or sensor interface(s) 910, one or more transceivers 912, one or more optional speakers 914, one or more optional microphones 916, and data storage 920. The device 900 may further include one or more buses 918 that functionally couple various components of the device 900. The device 900 may further include one or more antenna(e) 934 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 918 may include at least one of a system bus, memory bus, an address bus, or a message bus, and may permit exchange of information (e.g., data (including computer-executable code), signaling, etc.) between various components of the device 900. The bus(es) 918 may include, without limitation, a memory bus or a memory controller, a peripheral bus, an accelerated graphics port, and so forth. The bus(es) 918 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 904 of the device 900 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 904 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 904 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 920 may include removable storage and/or non-removable storage including, but not limited to, magnetic storage, optical disk storage, and/or tape storage. The data storage 920 may provide non-volatile storage of computer-executable instructions and other data. The memory 904 and the data storage 920, removable and/or non-removable, are examples of computer-readable storage media (CRSM) as that term is used herein.

The data storage 920 may store computer-executable code, instructions, or the like that may be loadable into the memory 904 and executable by the processor(s) 902 to cause the processor(s) 902 to perform or initiate various operations. The data storage 920 may additionally store data that may be copied to memory 904 for use by the processor(s) 902 during the execution of the computer-executable instructions. Moreover, output data generated as a result of execution of the computer-executable instructions by the processor(s) 902 may be stored initially in memory 904, and may ultimately be copied to data storage 920 for non-volatile storage.

More specifically, the data storage 920 may store one or more operating systems (O/S) 922; one or more database management systems (DBMS) 924; and one or more program module(s), applications, engines, computer-executable code, scripts, or the like such as, for example, one or more user interface generation module(s) 926, one or more communication module(s) 928, one or more state tracking module(s) 930, and/or one or more content selection module(s) 932. Some or all of these module(s) may be sub-module(s). Any of the components depicted as being stored in data storage 920 may include any combination of software, firmware, and/or hardware. The software and/or firmware may include computer-executable code, instructions, or the like that may be loaded into the memory 904 for execution by one or more of the processor(s) 902. Any of the components depicted as being stored in data storage 920 may support functionality described in reference to correspondingly named components earlier in this disclosure.

The data storage 920 may further store various types of data utilized by components of the device 900. Any data stored in the data storage 920 may be loaded into the memory 904 for use by the processor(s) 902 in executing computer-executable code. In addition, any data depicted as being stored in the data storage 920 may potentially be stored in one or more datastore(s) and may be accessed via the DBMS 924 and loaded in the memory 904 for use by the processor(s) 902 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 9, the datastore(s) may include, for example, operating mode settings for various applications, authorized speaker or user data, user identifiers associated with certain devices, location identifiers associated with certain user identifiers and/or device identifiers, device mapping data, user account and associated device data, device state data, user interface type data, and other information.

The processor(s) 902 may be configured to access the memory 904 and execute computer-executable instructions loaded therein. For example, the processor(s) 902 may be configured to execute computer-executable instructions of the various program module(s), applications, engines, or the like of the device 900 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 902 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 902 may be capable of supporting any of a variety of instruction sets.

Referring now to functionality supported by the various program module(s) depicted in FIG. 9, the user interface generation module(s) 926 may include computer-executable instructions, code, or the like that responsive to execution by one or more of the processor(s) 902 may perform functions including, but not limited to, determining device context data, determining available input types for a device, determining active or primary device input types for a device, determining and/or selecting content, requesting content from a third party computing system, receiving data from devices, determining changes to device context, generating user interfaces, determining device display functionality, automatically switching between user interface types and/or layouts, and the like.

The communication module(s) 928 may include computer-executable instructions, code, or the like that responsive to execution by one or more of the processor(s) 902 may perform functions including, but not limited to, communicating with one or more devices, for example, via wired or wireless communication, communicating with remote servers and/or systems, communicating with remote datastores, sending or receiving audio data, communicating with cache memory data, and the like.

The state tracking module(s) 930 may include computer-executable instructions, code, or the like that responsive to execution by one or more of the processor(s) 902 may perform functions including, but not limited to, determining an active or current device input type, determining active or current device display orientation, determining current device operating mode, causing changes to user interface types, initiate wireless communications, and the like.

The content selection module(s) 932 may include computer-executable instructions, code, or the like that responsive to execution by one or more of the processor(s) 902 may perform functions including, but not limited to, determining device associations, determining candidate content, determining user account and associated device data, determining display functionality and resolution, sending data to specific devices, detecting devices, determining locations, and the like.

Referring now to other illustrative components depicted as being stored in the data storage 920, the O/S 922 may be loaded from the data storage 920 into the memory 904 and may provide an interface between other application software executing on the device 900 and hardware resources of the device 900. More specifically, the O/S 922 may include a set of computer-executable instructions for managing hardware resources of the device 900 and for providing common services to other application programs (e.g., managing memory allocation among various application programs). In certain example embodiments, the O/S 922 may control execution of the other program module(s) to dynamically enhance characters for content rendering. The O/S 922 may include any operating system now known or which may be developed in the future including, but not limited to, any server operating system, any mainframe operating system, or any other proprietary or non-proprietary operating system.

The DBMS 924 may be loaded into the memory 904 and may support functionality for accessing, retrieving, storing, and/or manipulating data stored in the memory 904 and/or data stored in the data storage 920. The DBMS 924 may use any of a variety of database models (e.g., relational model, object model, etc.) and may support any of a variety of query languages. The DBMS 924 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the device 900 is a mobile device, the DBMS 924 may be any suitable light-weight DBMS optimized for performance on a mobile device.

Referring now to other illustrative components of the device 900, the input/output (I/O) interface(s) 906 may facilitate the receipt of input information by the device 900 from one or more I/O devices as well as the output of information from the device 900 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 900 or may be separate. The I/O devices may further include, for example, any number of peripheral devices such as data storage devices, printing devices, and so forth.

The I/O interface(s) 906 may also include an interface for an external peripheral device connection such as universal serial bus (USB), FireWire, Thunderbolt, Ethernet port or other connection protocol that may connect to one or more networks. The I/O interface(s) 906 may also include a connection to one or more of the antenna(e) 934 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The device 900 may further include one or more network interface(s) 908 via which the device 900 may communicate with any of a variety of other systems, platforms, networks, devices, and so forth. The network interface(s) 908 may enable communication, for example, with one or more wireless routers, one or more host servers, one or more web servers, and the like via one or more of networks.

The antenna(e) 934 may include any suitable type of antenna depending, for example, on the communications protocols used to transmit or receive signals via the antenna (e) 934. Non-limiting examples of suitable antennas may include directional antennas, non-directional antennas, dipole antennas, folded dipole antennas, patch antennas, multiple-input multiple-output (MIMO) antennas, or the like. The antenna(e) 934 may be communicatively coupled to one or more transceivers 912 or radio components to which or from which signals may be transmitted or received.

As previously described, the antenna(e) 934 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 934 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 934 may be configured to transmit or receive radio frequency signals within any suitable frequency range forming part of the unlicensed portion of the radio spectrum.

The antenna(e) 934 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 912 may include any suitable radio component(s) for—in cooperation with the antenna(e) 934—transmitting or receiving radio frequency (RF) signals in the bandwidth and/or channels corresponding to the communications protocols utilized by the device 900 to communicate with other devices. The transceiver(s) 912 may include hardware, software, and/or firmware for modulating, transmitting, or receiving—potentially in cooperation with any of antenna(e) 934—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 912 may further include hardware, firmware, or software for receiving GNSS signals. The transceiver(s) 912 may include any known receiver and baseband suitable for communicating via the communications protocols utilized by the device 900. The transceiver(s) 912 may further include a low noise amplifier (LNA), additional signal amplifiers, an analog-to-digital (A/D) converter, one or more buffers, a digital baseband, or the like.

The sensor(s)/sensor interface(s) 910 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 914 may be any device configured to generate audible sound. The optional microphone(s) 916 may be any device configured to receive analog sound input or audio data.

It should be appreciated that the program module(s), applications, computer-executable instructions, code, or the like depicted in FIG. 9 as being stored in the data storage 920 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the device 900, and/or hosted on other computing device(s) accessible via one or more networks, may be provided to support functionality provided by the program module(s), applications, or computer-executable code depicted in FIG. 9 and/or additional or alternate functionality. Further, functionality may be modularized differently such that processing described as being supported collectively by the collection of program module(s) depicted in FIG. 9 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 9 may be implemented, at least partially, in hardware and/or firmware across any number of devices.

It should further be appreciated that the device 900 may include alternate and/or additional hardware, software, or firmware components beyond those described or depicted without departing from the scope of the disclosure. More particularly, it should be appreciated that software, firmware, or hardware components depicted as forming part of the device 900 are merely illustrative and that some components may not be present or additional components may be provided in various embodiments. While various illustrative program module(s) have been depicted and described as software module(s) stored in data storage 920, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Figure 10:
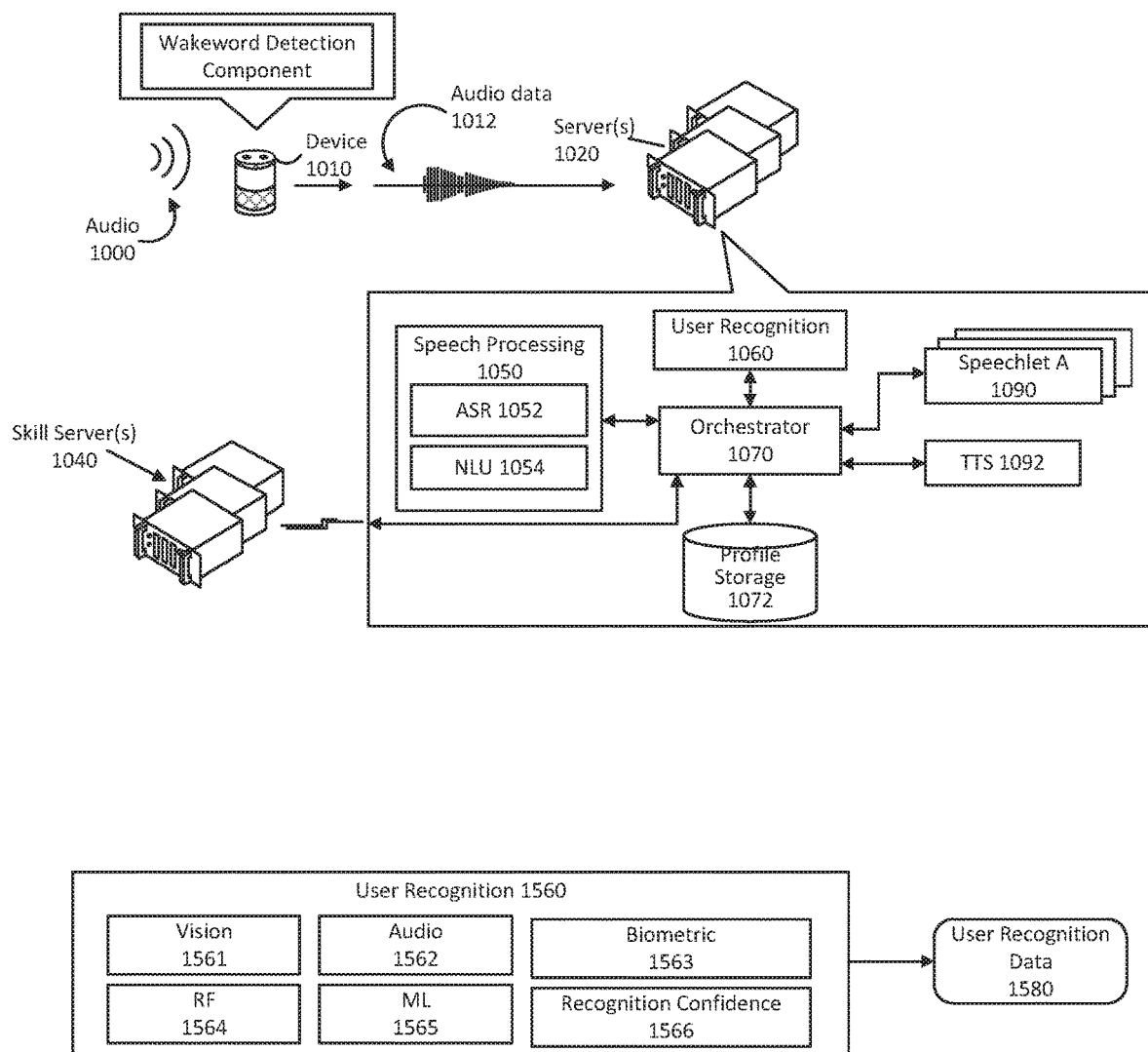
FIG. 10 is a schematic block diagram of components of a system in accordance with one or more example embodiments of the disclosure.

The system may operate using various components as described in FIG. 10. The various components illustrated FIG. 10 may be located on the same or different physical devices. Communication between various components illustrated in FIG. 10 may occur directly or across one or more network(s). The system of FIG. 10 may include one or more server(s) 1020 (e.g., an example of server(s) 1020 is discussed above as remote system 730) and one or more skill server(s) 1040 that may be in communication using one or more networks.

A device 1010 captures audio 1000 using an audio capture component, such as a microphone or array of microphones. The device 1010, using a wakeword detection component 1030, processes audio data corresponding to the audio 1000 to determine if a keyword (e.g., a wakeword) is detected in the audio data. Following detection of a wakeword, the device 1010 sends audio data 1012, corresponding to the audio 1000, to the one or more server(s) 1020.

Upon receipt by the server(s) 1020, the audio data 1012 may be sent to an orchestrator component 1070. The orchestrator component 1070 may include memory and logic that enables the orchestrator component 1070 to transmit various pieces and forms of data to various components of the system.

The orchestrator component 1070 sends the audio data 1012 to a speech processing component 1050. An ASR component 1052 of the speech processing component 1050 transcribes the audio data 1012 into one or more textual interpretations representing speech contained in the audio data 1012. The ASR component 1052 interprets the spoken utterance based on a similarity between the spoken utterance and pre-established language models. For example, the ASR component 1052 may compare the audio data 1012 with models for sounds (e.g., subword units such as phonemes) and sequences of sounds to identify words that match the sequence of sounds spoken in the utterance represented in the audio data 1012. The ASR component 1052 sends text data generated thereby to an NLU component 1054 of the speech processing component 1050. The text data sent from the ASR component 1052 to the NLU component 1054 may include a top scoring textual interpretation of the audio data 1012 or may include an N-best list including a group of textual interpretations of the audio data 1012, and potentially their respective scores.

The NLU component 1054 attempts to make a semantic interpretation of the phrases or statements represented in the text data input therein. That is, the NLU component 1054 determines one or more meanings associated with the phrases or statements represented in the text data based on individual words represented in the text data. The NLU component 1054 interprets a text string to derive an intent of the user (e.g., an action that the user desires be performed) as well as pertinent pieces of information in the text data that allow a device (e.g., the device 1010, the server(s) 1020, the skill server(s) 1040, etc.) to complete the intent. For example, if the text data corresponds to "play music," the NLU component 1054 may determine the user intended music to be output from one or more devices.

The server(s) 1020 may include a user recognition component 1060. The user recognition component 1060 may determine user that most likely spoke an input utterance as explained below.

The server(s) 1020 may include a profile storage 1072. The profile storage 1072 may include a variety of information related to individual devices, groups of devices, individual users, groups of users, etc. that interact with the system as described below.

The orchestrator component 1070 may send output from the NLU component 1054 (e.g., text data including tags attributing meaning to the words and phrases represented in the text data), and optionally output from the user recognition component 1060 and/or data from the profile storage 1072, to one or more speechlets 1090 and/or the one or more skill servers 1040 implementing one or more skills.

A "speechlet" may be software running on the server(s) 1020 that is akin to a software application running on a traditional desktop computer. That is, a speechlet 1090 may enable the server(s) 1020 to execute specific functionality in order to provide data or produce some other output requested by a user. The server(s) 1020 may be configured with more than one speechlet 1090. For example, a weather service speechlet may enable the server(s) 1020 to provide weather information, a car service speechlet may enable the server(s) 1020 to book a trip with respect to a taxi or ride sharing service, an order pizza speechlet may enable the server(s) 1020 to order a pizza with respect to a restaurant's online ordering system, etc. A speechlet may operate in conjunction between the server(s) 1020 and other devices such as a local device 1010 in order to complete certain functions. Inputs to the speechlet may come from speech processing interactions or through other interactions or input sources. In some embodiments, speechlets may send signals or data to client devices that cause the client device to activate a voice-forward operating mode or a tablet operating mode. A current operating mode of a client device may be stored at the server 1020. In some embodiments, a tablet-management speechlet may be included and may send a directive or command to a client device, such as a tablet, that causes the device to activate or switch into certain operating modes.

A speechlet may include a "skill." A skill may be software running on a skill server(s) 1040 that is akin to an application. That is, a skill may enable the skill server(s) 1040 to execute specific functionality in order to provide data or produce some other output requested by a user. A skill server(s) 1040 may be configured with more than one skill. For example, a weather service skill may enable the skill server(s) 1040 to provide weather information to the server(s) 1040, a car service skill may enable the skill server(s) 1040 to book a trip with respect to a taxi or ride sharing service, an order pizza skill may enable the skill server(s) 1040 to order a pizza with respect to a restaurant's online ordering system, etc. A skill may operate in conjunction between the skill server(s) 1040 and other devices such as the server(s) 1040 or local device in order to complete certain functions. Inputs to the skill may come from speech processing interactions or through other interactions or input sources. Skills may be associated with certain client devices while the client device is in a voice-forward mode. For example, while in a voice-forward mode, a client device may be associated with a music skill that can be used to cause playback of music using voice commands received at the client device.

The functions provided by one or more speechlets 1090 may overlap or be different from the functions provided by one or more skills. Speechlets 1090 may be implemented in some combination of hardware, software, firmware, etc.

The orchestrator component 1070 may choose which speechlet(s) 1090 and/or skill server(s) 1040 to send data to based on the output of the NLU component 1054. In an example, the orchestrator component 1070 may send data to a music playing speechlet(s) 1090 and/or skill server(s) 1040 when the NLU component 1054 outputs text data associated with a command to play music. In another example, the orchestrator component 1070 may send data to a weather speech(s) 1090 and/or skill server(s) 1040 when the NLU component 1054 outputs text data associated with a command to output weather information. In yet another example, the orchestrator component 1070 may send data to a search engine speechlet(s) 1090 and/or skill server(s) 1040 when the NLU component 1054 outputs text data associated with a command to obtain search results.

Speechlets 1090 and skill servers 1040 may output text data, which the orchestrator component 1070 may send to a text-to-speech (TTS) component 1092. The TTS component 1092 may synthesize speech corresponding to the text data input therein. The orchestrator component 1070 or other component of the server(s) 1040 may send audio data synthesized by the TTS component 1092 (or other output data from speechlet(s) 1090 or skill server(s) 1040) to the device 1010 (or another device including a speaker and associated with the same user ID or customer ID) for output to one or more users.

The TTS component 1092 may perform speech synthesis using one or more different methods. In one method of synthesis called unit selection, the TTS component 1092 matches text data against a database of recorded speech. Matching units are selected and concatenated together to form audio data. In another method of synthesis called parametric synthesis, the TTS component 1092 varies parameters such as frequency, volume, and noise to create an artificial speech waveform output. Parametric synthesis uses a computerized voice generator, sometimes called a vocoder.

The various components may exist in software, hardware, firmware, or some combination thereof.

The user recognition component 1060 may recognize one or more users using a variety of data. As illustrated in FIG. 10, the user recognition component 1060 may include one or more subcomponents including a vision component 1061, an audio component 1062, a biometric component 1063, a radio frequency (RF) component 1064, a machine learning (ML) component 1065, and a recognition confidence component 1066. In some instances, the user recognition component 1060 may monitor data and determinations from one or more subcomponents to determine an identity of one or more users in an environment. The user recognition component 1060 may output user recognition data 1080, which may include a user identifier associated with a user the system believes is interacting with the system. The user recognition data 1080 may be used to inform NLU component 1054 processes as well as processing performed by speechlets 1090, skill servers 1040, routing of output data, permission access to further information, etc.

The vision component 1061 may receive data from one or more sensors capable of providing images (e.g., cameras) or sensors indicating motion (e.g., motion sensors). The vision component 1061 can perform facial recognition or image analysis to determine an identity of a user and to associate that identity with a user profile associated with the user. In some instances, when a user is facing a camera, the vision component 1061 may perform facial recognition and identify the user with a high degree of confidence. In other instances, the vision component 1061 may have a low degree of confidence of an identity of a user, and the user recognition component 1060 may utilize determinations from additional components to determine an identity of a user. The vision component 1061 can be used in conjunction with other components to determine an identity of a user. For example, the user recognition component 1060 may user data from the vision component 1016 with data from the audio component 1062 to identify what user's face appears to be speaking at the same time audio is captured by a device the user is facing for purposes of identifying a user who spoke an utterance.

The system may include biometric sensors that transmit data to the biometric component 1063. For example, the biometric component 1063 may receive data corresponding to fingerprints, iris or retina scans, thermal scans, weights of users, a size of a user, pressure (e.g., within floor sensors), etc., and may determine a biometric profile corresponding to a user. The biometric component 1063 may distinguish between a user and sound from a television, for example. Thus, the biometric component 1063 may incorporate biometric information into a confidence level for determining an identity of a user. Biometric information output by the biometric component 1063 can be associated with a specific user profile such that the biometric information uniquely identifies a user profile of a user.

The RF component 1064 may use RF localization to track devices that a user may carry or wear. For example, a user (and a user profile associated with the user) may be associated with a computing device. The computing device may emit RF signals (e.g., Wi-Fi, Bluetooth®, etc.). A device may detect the signal and indicate to the RF component 1064 the strength of the signal (e.g., as a received signal strength indication (RSSI)). The RF component 1064 may use the RSSI to determine an identity of a user (with an associated confidence level). In some instances, the RF component 1064 may determine that a received RF signal is associated with a mobile device that is associated with a particular user.

In some instances, a device 1010 may include some RF or other detection processing capabilities so that a user who speaks an utterance may scan, tap, or otherwise acknowledge his/her personal device (such as a phone) to the device 1010. In this manner, the user may "register" with the system for purposes of the system determining who spoke a particular utterance. Such a registration may occur prior to, during, or after speaking of an utterance.

The ML component 1065 may track the behavior of various users in the environment as a factor in determining a confidence level of the identity of the user. By way of example, a user may adhere to a regular schedule such that the user is outside the environment during the day (e.g., at work or at school). In this example, the ML component 1065 would factor in past behavior and/or trends into determining the identity of the user that spoke an utterance to the system. Thus, the ML component 1065 may user historical data and/or usage patterns over time to increase or decrease a confidence level of an identity of a user.

In some instances, the recognition confidence component 1066 receives determinations from the various components, and may determine a final confidence level associated with the identity of a user. In some instances, the confidence level may determine whether an action is performed. For example, if a user request includes a request to unlock a door, a confidence level may need to be above a threshold that may be higher than a confidence level needed to perform a user request associated with playing a playlist or resuming a location in an audiobook. The confidence level or other score data may be included in the user recognition data 1080.

The audio component 1062 may receive data from one or more sensors capable of providing an audio signal (e.g., the device 1010, one or more microphones, etc.) to facilitate recognizing a user. The audio component 1062 may perform audio recognition on an audio signal to determine an identity of the user and an associated user profile. In some instances, aspects of the server(s) 1020 may be configured at a computing device (e.g., a local server) within the environment 202. Thus, in some instances, the audio component 1062 operating on a computing device in the environment may analyze all sound within the environment (e.g., without requiring a wake word) to facilitate recognizing a user. In some instances, the audio component 1062 may perform voice recognition to determine an identity of a user.

The audio component 1062 may also determine whether a user corresponds to a child or not a child based on audio characteristics. The audio component 1062 may include a model trained with respect to speech characteristics common to children. Using the trained model, the audio component 1062 may make a binary determination regarding whether the user that spoke the command is a child. The trained model(s) may determine a child is speaking based on acoustic properties of audio (e.g., pitch, prosody, energy) as well as other data/characteristics (e.g., vocabulary, sentence structure, direction of where audio of an utterance is received from (since children are shorter than adults)).

Child detection can be performed independently of user identity. For example, the system may use user recognition techniques and not be able to identify the specific speaking user, but may still be able to tell that the speaking user is a child or non-adult.

The audio component 1062 may also perform user identification based on information relating to a spoken utterance input into the system for speech processing. For example, the audio component 1062 may take as input the audio data 1012 and/or output data from the ASR component 1052. The audio component 1062 may determine scores indicating whether the command originated from particular users. For example, a first score may indicate a likelihood that the command originated from a first user, a second score may indicate a likelihood that the command originated from a second user, etc. The audio component 1062 may perform user recognition by comparing speech characteristics in the audio data 1012 to stored speech characteristics of users.

Figure 11:
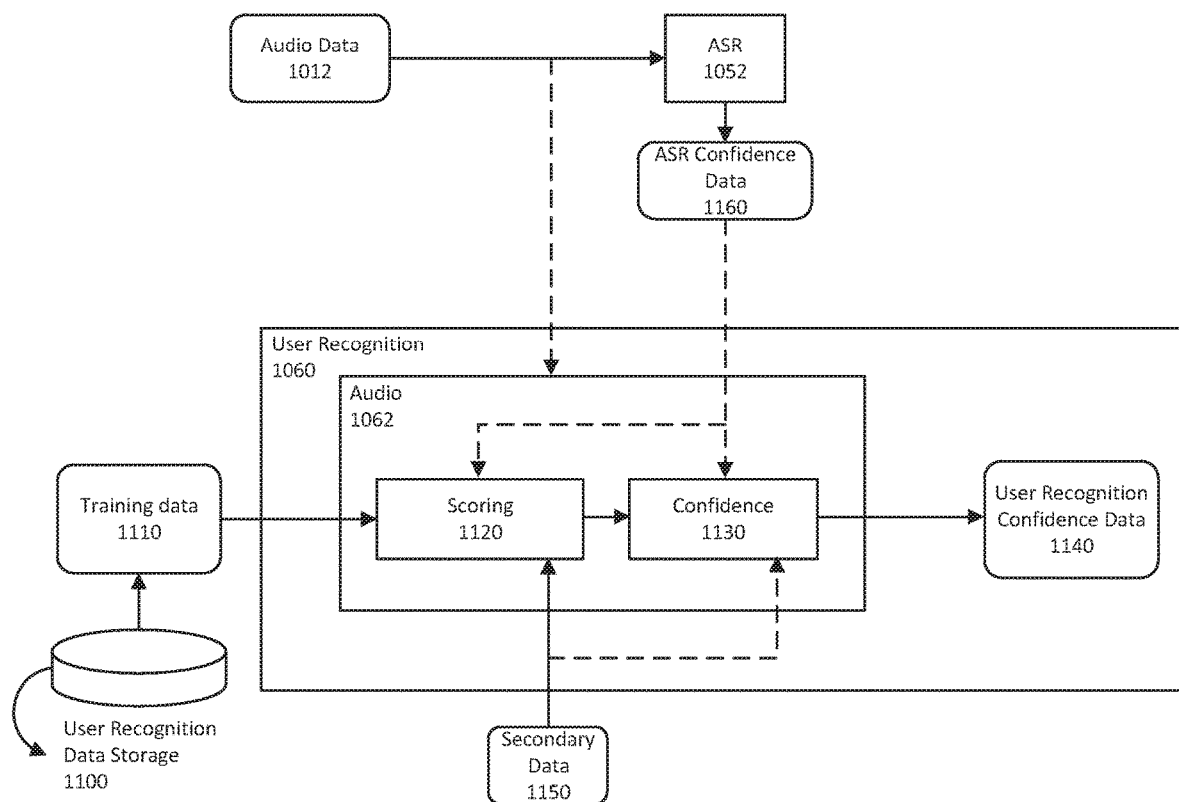
FIG. 11 is a system flow diagram illustrating user recognition in accordance with one or more example embodiments of the disclosure.

FIG. 11 illustrates the audio component 1062 of the user recognition component 1060 performing user recognition using audio data, for example input audio data 1012 corresponding to an input utterance. In addition to outputting text data as described above, the ASR component 1052 may also output ASR confidence data 1160, which is passed to the user recognition component 1060. The audio component 1062 performs user recognition using various data including the audio data 1012, training data 1110 corresponding to sample audio data corresponding to known users, the ASR confidence data 1160, and secondary data 1150. The audio component 1062 may output user recognition confidence data 1140 that reflects a certain confidence that the input utterance was spoken by one or more particular users. The user recognition confidence data 1140 may include an indicator of a verified user (such as a user ID corresponding to the speaker of the utterance) along with a confidence value corresponding to the user ID, such as a numeric value or binned value as discussed below. The user recognition confidence data 1140 may be used by various components, including other components of the user recognition component 1060 to recognize a user.

The training data 1110 may be stored in a user recognition data storage 1100. The user recognition data storage 1100 may be stored by the server(s) 1040, or may be a separate device. Further, the user recognition data storage 1100 may be part of a user profile in the profile storage 1072. The user recognition data storage 1100 may be a cloud-based storage. The training data 1110 stored in the user recognition data storage 1100 may be stored as waveforms and/or corresponding features/vectors. The training data 1110 may correspond to data from various audio samples, each audio sample associated with a known user and/or user identity. The audio samples may correspond to voice profile data for one or more users. For example, each user known to the system may be associated with some set of training data 1110/voice profile data for the known user. Thus, the training data 1110 may include a biometric representation of a user's voice. The audio component 1062 may then use the training data 1110 to compare against incoming audio data 1012 to determine the identity of a user speaking an utterance. The training data 1110 stored in the user recognition data storage 1100 may thus be associated with multiple users of multiple devices. Thus, the training data 1110 stored in the user recognition data storage 1100 may be associated with both a user that spoke the respective utterance, as well as the device 1010 that captured the respective utterance.

To perform user recognition, the audio component 1062 may determine the device 1010 from which the audio data 1012 originated. For example, the audio data 1012 may include a tag or other metadata indicating the device 1010. Either the device 1010 or the server(s) 1040 may tag the audio data 1012 as such. The user recognition component 1060 may send a signal to the user recognition data storage 1100, with the signal requesting only training data 1110 associated with known users of the device 1010 from which the audio data 1012 originated. This may include accessing a user profile(s) associated with the device 1010 and then only inputting training data 1110 associated with users corresponding to the user profile(s) of the device 1010. This limits the universe of possible training data the audio component 1062 should consider at runtime when recognizing a user and thus decreases the amount of time to perform user recognition by decreasing the amount of training data 1110 needed to be processed. Alternatively, the user recognition component 1060 may access all (or some other subset of) training data 1110 available to the system. Alternatively, the audio component 1062 may access a subset of training data 1110 of users potentially within the environment of the device 1010 from which the audio data 1012 originated, as may otherwise have been determined by the user recognition component 1060.

If the audio component 1062 receives training data 1110 as an audio waveform, the audio component 1062 may determine features/vectors of the waveform(s) or otherwise convert the waveform into a data format that can be used by the audio component 1062 to actually perform the user recognition. The audio component 1062 may then identify the user that spoke the utterance in the audio data 1012 by comparing features/vectors of the audio data 1012 to training features/vectors (either received from the user recognition data storage 1100 or determined from training data 1110 received from the user recognition data storage 1100).

The audio component 1062 may include a scoring component 1120 which determines respective scores indicating whether the input utterance (represented by the audio data 1012) was spoken by particular users (represented by the training data 1110). The audio component 1062 may also include a confidence component 1130 that determines an overall confidence as the accuracy of the user recognition operations (such as those of the scoring component 1120) and/or an individual confidence for each user potentially identified by the scoring component 1120. The output from the scoring component 1120 may include scores for all users with respect to which user recognition was performed (e.g., all users associated with the device 1010). For example, the output may include a first score for a first user, a second score for a second user, and third score for a third user, etc. Although illustrated as two separate components, the scoring component 1120 and confidence component 1130 may be combined into a single component or may be separated into more than two components.

The scoring component 1120 and confidence component 1130 may implement one or more trained machine learning models (such neural networks, classifiers, etc.) as known in the art. For example, the scoring component 1120 may use probabilistic linear discriminant analysis (PLDA) techniques. PLDA scoring determines how likely it is that an input audio data feature vector corresponds to a particular training data feature vector for a particular user. The PLDA scoring may generate similarity scores for each training feature vector considered and may output the list of scores and users and/or the user ID of the speaker whose training data feature vector most closely corresponds to the input audio data feature vector. The scoring component 1120 may also use other techniques such as GMMs, generative Bayesian models, or the like, to determine similarity scores.

The confidence component 1130 may input various data including information about the ASR confidence data 1160, utterance length (e.g., number of frames or time of the utterance), audio condition/quality data (such as signal-to-interference data or other metric data), fingerprint data, image data, or other factors to consider how confident the audio component 1062 is with regard to the scores linking users to the input utterance. The confidence component 1130 may also consider the similarity scores and user IDs output by the scoring component 1120. Thus, the confidence component 1130 may determine that a lower ASR confidence represented in the ASR confidence data 1160, or poor input audio quality, or other factors, may result in a lower confidence of the audio component 1062. Whereas a higher ASR confidence represented in the ASR confidence data 1160, or better input audio quality, or other factors, may result in a higher confidence of the audio component 1062. Precise determination of the confidence may depend on configuration and training of the confidence component 1130 and the models used therein. The confidence component 1130 may operate using a number of different machine learning models/techniques such as GMM, neural networks, etc. For example, the confidence component 1130 may be a classifier configured to map a score output by the scoring component 1120 to a confidence.

The audio component 1062 may output user recognition confidence data 1140 specific to a single user, or multiple users in the form of an N-best list. For example, the audio component 1062 may output user recognition confidence data 1140 with respect to each user indicated in the profile associated with the device 1010 from which the audio data 1012 was received. The audio component 1062 may also output user recognition confidence data 1140 with respect to each user potentially in the location of the device 1010 from which the audio data 1012 was received.

The user recognition confidence data 1140 may include particular scores (e.g., 0.0-1.0, 0-1000, or whatever scale the system is configured to operate). Thus, the system may output an N-best list of potential users with confidence scores (e.g., John—0.2, Jane—0.8). Alternatively or in addition, the user recognition confidence data 1140 may include binned recognition indicators. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Thus, the system may output an N-best list of potential users with binned scores (e.g., John—low, Jane—high). Combined binned and confidence score outputs are also possible. Rather than a list of users and their respective scores and/or bins, the user recognition confidence data 1140 may only include information related to the top scoring user as determined by the audio component 1062. The scores and bins may be based on information determined by the confidence component 1130. The audio component 1062 may also output a confidence value that the scores/bins are correct, where the confidence value indicates how confident the audio component 1062 is in the output results. This confidence value may be determined by the confidence component 1130.

The confidence component 1130 may determine individual user confidences and differences between user confidences when determining the user recognition confidence data 1140. For example, if a difference between a first user's confidence score and a second user's confidence score is large, and the first user's confidence score is above a threshold, then the audio component 510 is able to recognize the first user as the user that spoke the utterance with a much higher confidence than if the difference between the users' confidences were smaller.

The audio component 1062 may perform certain thresholding to avoid incorrect user recognition results being output. For example, the audio component 1062 may compare a confidence score output by the confidence component 1130 to a confidence threshold. If the confidence score is not above the confidence threshold (for example, a confidence of "medium" or higher), the user audio component 1062 may not output user recognition confidence data 1140, or may only include in that data 1140 an indication that a user speaking the utterance could not be verified. Further, the audio component 1062 may not output user recognition confidence data 1140 until enough input audio data 1012 is accumulated and processed to verify the user above a threshold confidence. Thus, the audio component 1062 may wait until a sufficient threshold quantity of audio data 1012 of the utterance has been processed before outputting user recognition confidence data 1140. The quantity of received audio data 1012 may also be considered by the confidence component 1130.

The audio component 1062 may be defaulted to output binned (e.g., low, medium, high) user recognition confidence data 1140. However, such may be problematic from the speechlet(s) 1090 and skill server(s) 1040 perspectives. For example, if the audio component 1062 computes a single binned confidence for multiple users, a speechlet(s) 1090/skill server(s) 1040 may not be able to determine which user to determine content with respect to. In this situation, the audio component 1062 may be configured to override its default setting and output user recognition confidence data 1140 including values (e.g., 0.0-1.0) associated with the users associated with the same binned confidence. This enables the speechlet(s) 1090/skill server(s) 1040 to select content associated with the user associated with the highest confidence value. The user recognition confidence data 1140 may also include the user IDs corresponding to the potential user(s) who spoke the utterance.

The user recognition component 1060 may combine data from components to determine the identity of a particular user. As part of its audio-based user recognition operations, the audio component 1062 may use secondary data 1150 to inform user recognition processing. Thus, a trained model or other component of the audio component 1062 may be trained to take secondary data 1150 as an input feature when performing recognition. Secondary data 1150 may include a wide variety of data types depending on system configuration and may be made available from other sensors, devices, or storage such as user profile data, etc. The secondary data 1150 may include a time of day at which the audio data 1012 was captured, a day of a week in which the audio data 1012 was captured, the text data output by the ASR component 1052, NLU results data, and/or other data.

In one example, secondary data 1150 may include image data or video data. For example, facial recognition may be performed on image data or video data received corresponding to the received audio data 1012. Facial recognition may be performed by the vision component 1061, or by another component of the server(s) 1040. The output of the facial recognition process may be used by the audio component 1062. That is, facial recognition output data may be used in conjunction with the comparison of the features/vectors of the audio data 1012 and training data 1110 to perform more accurate user recognition.

The secondary data 1150 may also include location data of the device 1010. The location data may be specific to a building within which the device 1010 is located. For example, if the device 1010 is located in user A's bedroom, such location may increase user recognition confidence data associated with user A, but decrease user recognition confidence data associated with user B.

The secondary data 1150 may also include data related to the profile of the device 1010. For example, the secondary data 1150 may further include type data indicating a type of the device 1010. Different types of devices may include, for example, a smart watch, a smart phone, a tablet computer, and a vehicle. The type of device may be indicated in the profile associated with the device. For example, if the device 1010 from which the audio data 1012 was received is a smart watch or vehicle belonging to user A, the fact that the device 1010 belongs to user A may increase user recognition confidence data associated with user A, but decrease user recognition confidence data associated with user B. Alternatively, if the device 1010 from which the audio data 1012 was received is a public or semi-public device, the system may user information about the location of the device to cross-check other potential user locating information (such as calendar data, etc.) to potentially narrow the potential users to be recognized with respect to the audio data 1012.

The secondary data 1150 may additionally include geographic coordinate data associated with the device 1010. For example, a profile associated with a vehicle may indicate multiple users (e.g., user A and user B). The vehicle may include a global positioning system (GPS) indicating latitude and longitude coordinates of the vehicle when the audio data 1012 is captured by the vehicle. As such, if the vehicle is located at a coordinate corresponding to a work location/building of user A, such may increase user recognition confidence data associated with user A, but decrease user recognition confidence data of all other users indicated in the profile associated with the vehicle. Global coordinates and associated locations (e.g., work, home, etc.) may be indicated in a user profile associated with the device 1010. The global coordinates and associated locations may be associated with respective users in the user profile storage 1072.

The secondary data 1150 may also include other data/signals about activity of a particular user that may be useful in performing user recognition of an input utterance. For example, if a user has recently entered a code to disable a home security alarm, and the utterance corresponds to a device at the home, signals from the home security alarm about the disabling user, time of disabling, etc. may be reflected in the secondary data 1150 and considered by the audio component 1062. If a mobile device (such as a phone, Tile, dongle, or other device) known to be associated with a particular user is detected proximate to (for example physically close to, connected to the same WiFi network as, or otherwise nearby) the device 1010, this may be reflected in the secondary data 1150 and considered by the audio component 1062.

The user recognition confidence data 1140 output by the audio component 1062 may be used by other components of the user recognition component 1060 and/or may be sent to one or more speechlets 1090, skill servers 1040, the orchestrator 1070, or to other components. The speechlet(s) 1090/skill server(s) 1040 that receives the NLU results and the user recognition confidence score data 1140 (or other user recognition results as output by the user recognition component 1060) may be determined by the server(s) 1040 as corresponding to content responsive to the utterance in the audio data 1012. For example, if the audio data 1012 includes the utterance "Play my music," the NLU results and user recognition confidence data 1140 (or other output user recognition data) may be sent to a music playing speechlet(s) 1090/skill server(s) 1040.

Figure 12:
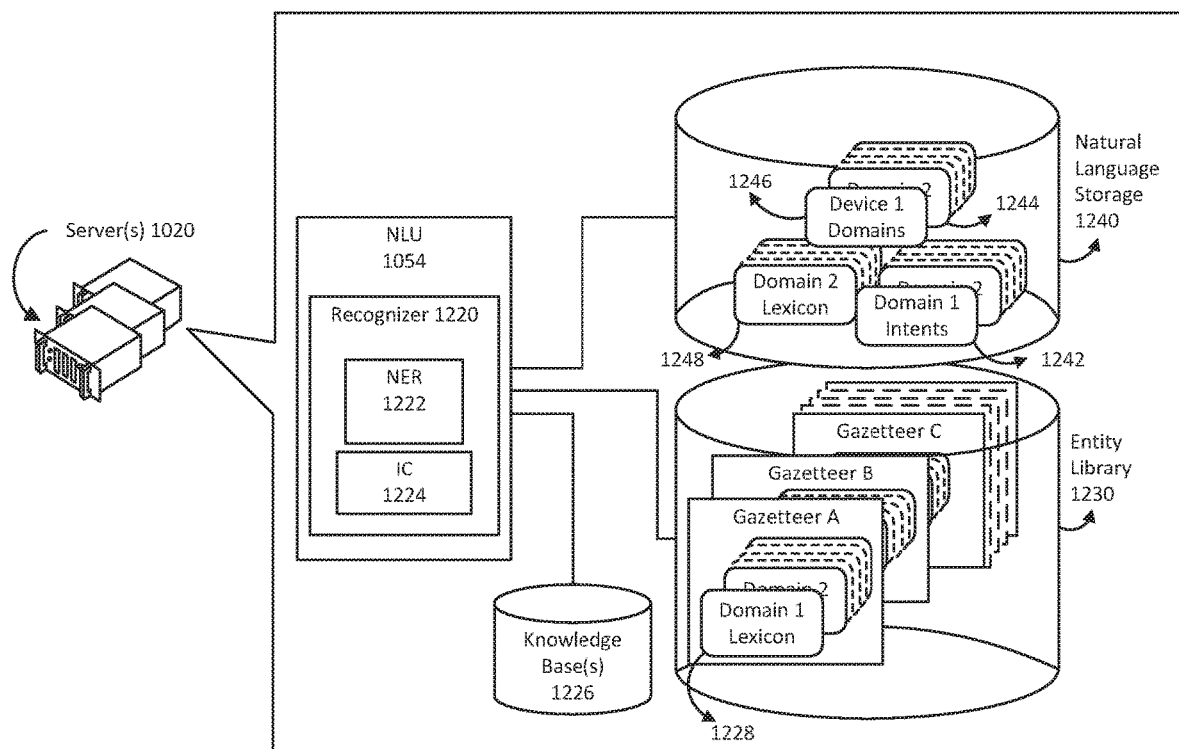
FIGS. 12-13 are schematic diagrams of how natural language processing may be performed in accordance with one or more example embodiments of the disclosure.

FIG. 12 illustrates how NLU processing is performed on audio data. Generally, the NLU component 1054 attempts to make a semantic interpretation of text represented in text data (e.g., ASR results output by the ASR component 1052). That is, the NLU component 1054 determines the meaning behind the text represented in text data based on the individual words. The NLU component 1054 interprets text to derive an intent or a desired action from an utterance as well as the pertinent pieces of information in the text that allow a device (e.g., device 1010, server(s) 1040, speechlet(s) 1090, skill server(s) 1040) to complete that action.

The NLU component 1054 may process text data including several textual interpretations of a single utterance. For example, if the ASR component 1052 outputs ASR results including an N-best list of textual interpretations, the NLU component 1054 may process the text data with respect to all (or a portion of) the textual interpretations represented therein.

The NLU component 1054 may include one or more recognizers 1220. Each recognizer 1220 may be associated with a different speechlet 1090. The NLU component 1054 may determine a speechlet 1090 potentially associated with a textual interpretation represented in text data input thereto in order to determine the proper recognizer 1220 to process the textual interpretation. The NLU component 1054 may determine a single textual interpretation is potentially associated with more than one speechlet 1090. Multiple recognizers 1220 may be functionally linked (e.g., a telephony/communications recognizer and a calendaring recognizer may utilize data from the same contact list).

If the NLU component 1054 determines a specific textual interpretation is potentially associated with multiple speechlets 1090, the recognizers 1220 associated with the speechlets 1090 may process the specific textual interpretation in parallel. For example, if a specific textual interpretation potentially implicates both a communications speechlet and a music speechlet, a recognizer associated with the communications speechlet may process the textual interpretation in parallel, or substantially in parallel, with a recognizer associated with the music speechlet processing the textual interpretation. The output generated by each recognizer may be scored, with the overall highest scored output from all recognizers ordinarily being selected to be the correct result.

The NLU component 1054 may communicate with various storages to determine the potential speechlet(s) associated with a textual interpretation. The NLU component 1054 may communicate with an NLU storage 1240, which includes databases of devices (1246) identifying speechlets associated with specific devices. For example, the device 1010 may be associated with speechlets for music, calendaring, contact lists, device-specific communications, etc. In addition, the NLU component 1054 may communicate with an entity library 1230, which includes database entries about specific services on a specific device, either indexed by device ID, user ID, or group user ID, or some other indicator.

Each recognizer 1220 may include a named entity recognition (NER) component 1222. The NER component 1222 attempts to identify grammars and lexical information that may be used to construe meaning with respect to a textual interpretation input therein. The NER component 1222 identifies portions of text represented in text data input into the NLU component 1054 that correspond to a named entity that may be recognizable by the system. The NER component 1222 (or other component of the NLU component 1054) may also determine whether a word refers to an entity that is not explicitly mentioned in the utterance text, for example "him," "her," "it" or other anaphora, exophora, or the like.

Each recognizer 1220, and more specifically each NER component 1222, may be associated with a particular grammar model and/or database 1248, a particular set of intents/actions 1242, and a particular personalized lexicon 1228. Each gazetteer may include speechlet-indexed lexical information associated with a particular user and/or device. For example, the Gazetteer A includes speechlet-indexed lexical information 1228. A user's music speechlet lexical information might include album titles, artist names, and song names, for example, whereas a user's contact-list lexical information might include the names of contacts. Since every user's music collection and contact list is presumably different, this personalized information improves entity resolution.

An NER component 1222 applies grammar models 1248 and lexical information 1228 associated with the speechlet (associated with the recognizer 1220 implementing the NER component 1222) to determine a mention one or more entities in a textual interpretation input therein. In this manner, the NER component 1222 identifies "slots" (i.e., particular words in a textual interpretation) that may be needed for later command processing. The NER component 1222 may also label each slot with a type of varying levels of specificity (e.g., noun, place, city, artist name, song name, etc.).

Each grammar model 1248 includes the names of entities (i.e., nouns) commonly found in speech about the particular speechlet to which the grammar model 1248 relates, whereas the lexical information 1228 is personalized to the user(s) and/or the device 1010 from which the audio data 1012 originated. For example, a grammar model 1248 associated with a shopping speechlet may include a database of words commonly used when people discuss shopping.

A downstream process called named entity resolution actually links a portion of text to an actual specific entity known to the system. To perform named entity resolution, the NLU component 1054 may utilize gazetteer information stored in an entity library storage 1230. The gazetteer information may be used to match text represented in text data output by the ASR component 1052 with different entities, such as song titles, contact names, etc. Gazetteers may be linked to users (e.g., a particular gazetteer may be associated with a specific user's music collection), may be linked to certain speechlet categories (e.g., shopping, music, video, communications, etc.), or may be organized in a variety of other ways.

Each recognizer 1220 may also include an intent classification (IC) component 1224. The IC component 1224 parses an input textual interpretation to determine an intent(s) of the speechlet associated with the recognizer 1220 that potentially corresponds to the textual interpretation. An intent corresponds to an action to be performed that is responsive to the command represented by the textual interpretation. The IC component 1224 may communicate with a database 1242 of words linked to intents. For example, a music intent database may link words and phrases such as "quiet," "volume off," and "mute" to a "mute" intent. The IC component 1224 identifies potential intents by comparing words in the textual interpretation to the words and phrases in an intents database 1242 associated with the speechlet that is associated with the recognizer 1220 implementing the IC component 1224.

The intents identifiable by a specific IC component 1224 are linked to speechlet-specific (i.e., the speechlet associated with the recognizer 1220 implementing the IC component 1224) grammar frameworks 1248 with "slots" to be filled. Each slot of a grammar framework 1248 corresponds to a portion of the text interpretation that the system believes corresponds to an entity. For example, a grammar framework 1248 corresponding to a <PlayMusic> intent may correspond to textual interpretation sentence structures such as "Play {Artist Name}," "Play {Album Name}," "Play {Song name}," "Play {Song name} by {Artist Name}," etc. However, to make resolution more flexible, grammar frameworks 1248 may not be structured as sentences, but rather based on associating slots with grammatical tags.

For example, an NER component 1222 may parse a textual interpretation to identify words as subject, object, verb, preposition, etc. based on grammar rules and/or models prior to recognizing named entities in the textual interpretation. An IC component 1224 (implemented by the same recognizer 1220 as the NER component 1222) may use the identified verb to identify an intent. The NER component 1222 may then determine a grammar model 1248 associated with the identified intent. For example, a grammar model 1248 for an intent corresponding to <PlayMusic> may specify a list of slots applicable to play the identified "object" and any object modifier (e.g., a prepositional phrase), such as {Artist Name}, {Album Name}, {Song name}, etc. The NER component 1222 may then search corresponding fields in a lexicon 1228 associated with the speechlet associated with the recognizer 1220 implementing the NER component 1222, attempting to match words and phrases in the textual interpretation the NER component 1222 previously tagged as a grammatical object or object modifier with those identified in the lexicon 1228.

An NER component 1222 may perform semantic tagging, which is the labeling of a word or combination of words according to their type/semantic meaning. An NER component 1222 may parse a textual interpretation heuristic grammar rules, or a model may be constructed using techniques such as hidden Markov models, maximum entropy models, log linear models, conditional random fields (CRF), and the like. For example, an NER component 1222 implemented by a music speechlet recognizer 1220 may parse and tag a textual interpretation corresponding to "play mother's little helper by the rolling stones" as {Verb}: "Play," {Object}: "mother's little helper," {Object Preposition}: "by," and {Object Modifier}: "the rolling stones." The NER component 1222 identifies "Play" as a verb based on a word database associated with the music speechlet, which an IC component 1224 (also implemented by the music speechlet recognizer 1220) may determine corresponds to a <PlayMusic> intent. At this stage, no determination has been made as to the meaning of "mother's little helper" and "the rolling stones," but based on grammar rules and models, the NER component 1222 has determined that the text of these phrases relates to the grammatical object (i.e., entity) of the textual interpretation.

The frameworks linked to the intent are then used to determine what database fields should be searched to determine the meaning of these phrases, such as searching a user's gazetteer for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve a slot/field using gazetteer information, the NER component 1222 may search the database of generic words associated with the speechlet (in the knowledge base 1226). For example, if the textual interpretation was "play songs by the rolling stones," after failing to determine an album name or song name called "songs" by "the rolling stones," the NER component 1222 may search the speechlet vocabulary for the word "songs." In the alternative, generic words may be checked before the gazetteer information, or both may be tried, potentially producing two different results.

The NLU component 1054 may tag the textual interpretation to attribute meaning to the textual interpretation. For example, the NLU component 1054 may tag "play mother's little helper by the rolling stones" as: {intent}<PlayMusic>, {artist name} rolling stones, {media type} SONG, and {song title} mother's little helper. For further example, the NLU component 1054 may tag "play songs by the rolling stones" as: {intent}<PlayMusic>, {artist name} rolling stones, and {media type} SONG.

Certain recognizers 1220 may only be authorized to operate for certain users. For example, some recognizers 1220 may only be authorized to operate for adult users (e.g., users of eighteen years of age or older). The NLU component 1054 may use some combination of user recognition data 1080 user profile data to confirm the user's identity/type. Based thereon, the NLU component 1054 may determine which recognizers 1220 may operate with respect to input text data (i.e., ASR results 741).

Figure 13:
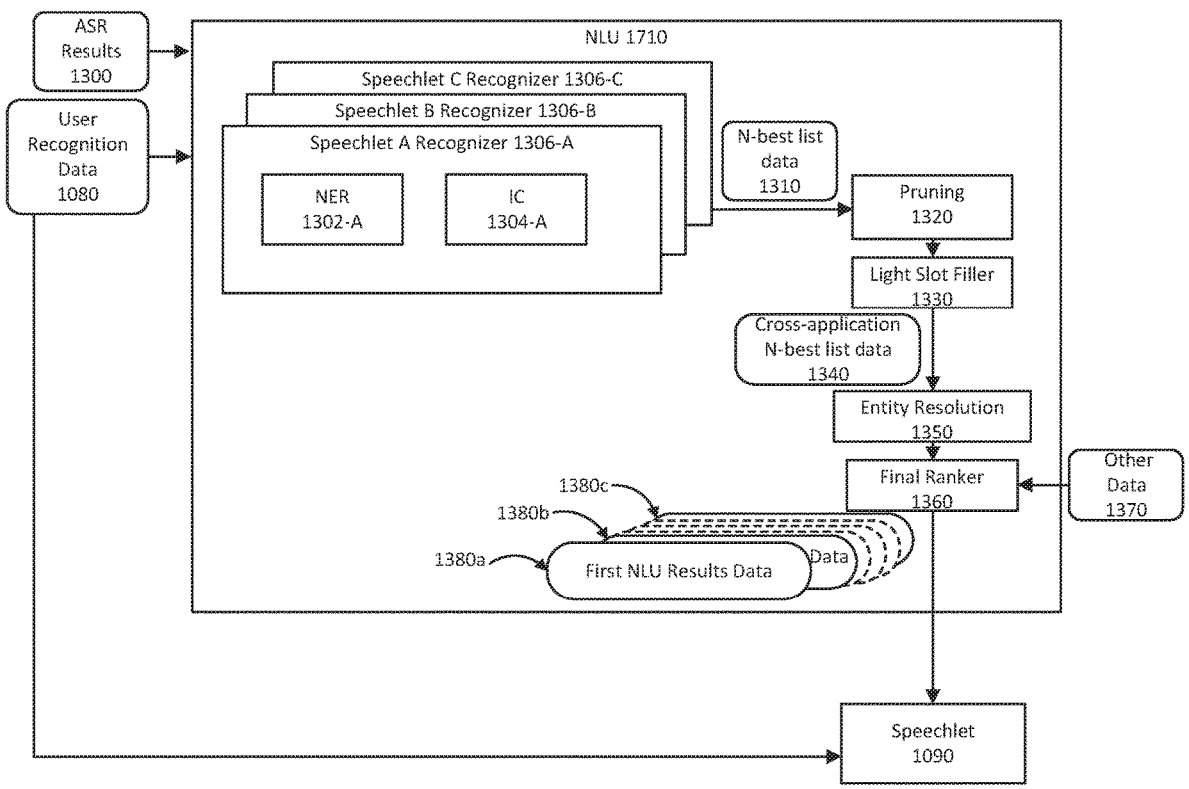

Each recognizer 1220 may output data corresponding to a single textual interpretation or to an N-best list of textual interpretations. The NLU component 1054 may compile the output data of the recognizers 1220 into a single N-best list, and may send N-best list data 1310 (representing the N-best list) to a pruning component 1320 (as illustrated in FIG. 13). The tagged textual interpretations in the N-best list data 1310 may each be associated with a respective score indicating the tagged textual interpretation corresponds to the speechlet associated with the recognizer 1220 from which the tagged textual interpretation was output. For example, the N-best list data 1310 may be represented as:

[0.95] Intent: <PlayMusic> ArtistName: Lady Gaga SongName: Poker Face

[0.70] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The pruning component 1320 creates a new, shorter N-best list (i.e., represented in N-best list data 1340 discussed below) based on the N-best list data 1310. The pruning component 1320 may sort the tagged textual interpretations represented in the N-best list data 1310 according to their respective scores.

The pruning component 1320 may perform score thresholding with respect to the N-best list data 1310. For example, the pruning component 1320 may select textual interpretations represented in the N-best list data 1310 associated with a score satisfying (e.g., meeting and/or exceeding) a score threshold. The pruning component 1320 may also or alternatively perform number of textual interpretation thresholding. For example, the pruning component 1320 may select the top scoring textual interpretation(s) associated with each different category of speechlet (e.g., music, shopping, communications, etc.) represented in the N-best list data 1310, with the new N-best list data 1340 including a total number of textual interpretations meeting or falling below a threshold number of textual interpretations. The purpose of the pruning component 1320 is to create a new list of top scoring textual interpretations so that downstream (more resource intensive) processes may only operate on the tagged textual interpretations that most likely correspond to the command input to the system.

The NLU component 1054 may also include a light slot filler component 1330. The light slot filler component 1330 can take text from slots represented in the textual interpretation(s) output by the pruning component 1320 and alter it to make the text more easily processed by downstream components. The light slot filler component 1330 may perform low latency operations that do not involve heavy operations such as reference to a knowledge base. The purpose of the light slot filler component 1330 is to replace words with other words or values that may be more easily understood by downstream components. For example, if a textual interpretation includes the word "tomorrow," the light slot filler component 1330 may replace the word "tomorrow" with an actual date for purposes of downstream processing. Similarly, the light slot filler component 1330 may replace the word "CD" with "album" or the words "compact disc." The replaced words are then included in the N-best list data 1340.

The NLU component 1054 sends the N-best list data 1340 to an entity resolution component 1350. The entity resolution component 1350 can apply rules or other instructions to standardize labels or tokens from previous stages into an intent/slot representation. The precise transformation may depend on the speechlet (e.g., for a travel speechlet, the entity resolution component 1350 may transform a text mention of "Atlanta airport" to the standard ATL three-letter code referring to the airport). The entity resolution component 1350 can refer to an authority source (e.g., a knowledge base) that is used to specifically identify the precise entity referred to in each slot of each textual interpretation represented in the N-best list data 1340. Specific intent/slot combinations may also be tied to a particular source, which may then be used to resolve the text. In the example "play songs by the stones," the entity resolution component 1350 may reference a personal music catalog, Amazon Music account, user profile 802 (described herein), or the like. The entity resolution component 1350 may output data including an altered N-best list that is based on the N-best list represented in the N-best list data 1340, but also includes more detailed information (e.g., entity IDs) about the specific entities mentioned in the slots and/or more detailed slot data that can eventually be used by a speechlet(s) 1090 which may be incorporated into the server(s) 1040 components or pipeline or may be on a separate device(s) (e.g., a skill server(s) 1040) in communication with the server(s) 1040. The NLU component 1054 may include multiple entity resolution components 1350 and each entity resolution component 1350 may be specific to one or more speechlets.

The entity resolution component 1350 may not be successful in resolving every entity and filling every slot represented in the N-best list represented in the N-best list data 1340. This may result in the entity resolution component 1350 outputting incomplete results. The NLU component 1054 may include a final ranker component 1360, which may consider such errors when determining how to rank the tagged textual interpretations for potential execution. For example, if a book speechlet recognizer 1220 outputs a tagged textual interpretation including a <ReadBook> intent flag, but the entity resolution component 1350 cannot find a book with a title matching the text of the item, the final ranker component 1360 may re-score that particular tagged textual interpretation to be given a lower score. The final ranker component 1360 may also assign a particular confidence to each tagged textual interpretation input therein. The confidence score of a particular tagged textual interpretation may be affected by whether the tagged textual interpretation has unfilled slots. For example, if a tagged textual interpretation associated with a first speechlet includes slots that are all filled/resolved, that tagged textual interpretation may be associated with a higher confidence than another tagged textual interpretation including at least some slots that are unfilled/unresolved.

The final ranker component 1360 may apply re-scoring, biasing, or other techniques to obtain the most preferred tagged and resolved textual interpretation. To do so, the final ranker component 1360 may consider not only the data output by the entity resolution component 1350, but may also consider other data 1370. The other data 1370 may include a variety of information. For example, the other data 1370 may include speechlet rating or popularity data. For example, if one speechlet has a particularly high rating, the final ranker component 1360 may increase the score of a textual interpretation(s) associated with or otherwise invoking that particular speechlet. The other data 1370 may also include information about speechlets that have been specifically enabled by the user. For example, the final ranker component 1360 may assign higher scores to textual interpretations associated with or otherwise invoking enabled speechlets than textual interpretations associated with or otherwise invoking non-enabled speechlets. User history may also be considered, such as if the user regularly uses a particular speechlet or does so at particular times of day. Date, time, location, weather, type of device 1010, user ID, context, and other information may also be considered. For example, the final ranker component 1360 may consider when any particular speechlets are currently active (e.g., music being played, a game being played, etc.).

Following final ranking, the NLU component 1054 may output NLU output data 1380. The NLU component 1054 may send the NLU output data 1380 to the orchestrator component 1070, which sends the NLU output data 1380 to an appropriate speechlet 1090 or skill server(s) 1040 (e.g., one configured to execute a command based on the textual interpretation represented in the NLU output data 1380). The NLU output data 1380 may include an indicator of the intent of the textual interpretation along with data associated with the intent, for example an indication that the intent is <PlayMusic> and the music to be played is "Adele." Multiple instances of NLU output data (e.g., 1380a-1380n) may be output for a given set of text data input into the NLU component 1054.

The speechlet(s) 1090/skill server(s) 1040 provides the server(s) 1040 with data responsive to the NLU output data 1380 received thereby. If the data is text data that needs to be converted to computerized speech, the orchestrator component 1070 sends the text data to the TTS component 1092.

User recognition data 1080 may also be used by the NLU component 1054 and/or the speechlet 1090/skill server(s) 1040 to ensure that any user specific commands are properly interpreted and executed.

A user identified using techniques described herein may be associated with a user identifier (ID), user profile, or other information known about the user by the system. As part of the user recognition techniques described herein, the system may determine the user identifier, user profile, or other such information. The profile storage 1072 may include data corresponding to profiles that may be used by the system to perform speech processing. Such profiles may include a user profile that links various data about a user such as user preferences, user owned devices, address information, contacts, enabled speechlets, payment information, etc. Each user profile may be associated with a different user ID. A profile may be an umbrella profile specific to a group of users. That is, a user profile may encompass two or more individual user profiles, each associated with a unique respective user ID. For example, a profile may be a household profile that encompasses user profiles associated with multiple users of a single household. A profile may include preferences shared by all the user profiles encompassed thereby. Each user profile encompassed under a single user profile may include preferences specific to the user associated therewith. That is, each user profile may include preferences unique with respect to one or more other user profiles encompassed by the same profile. A user profile may be a stand-alone profile or may be encompassed under a group profile.

A profile may also be a device profile corresponding to information about a particular device, for example a device ID, location, owner entity, whether the device is in a public, semi-public, or private location (which may be indicated by a public and/or semi-public flag), device capabilities, device hardware, or the like.

A profile may also be an entity profile, for example belonging to a business, organization, or other non-user entity. Such an entity profile may include information that may otherwise be found in a user and/or device profile, only such information is associated with the entity. The entity profile may include information regarding which users and/or devices are associated with the entity.

Figure 14:
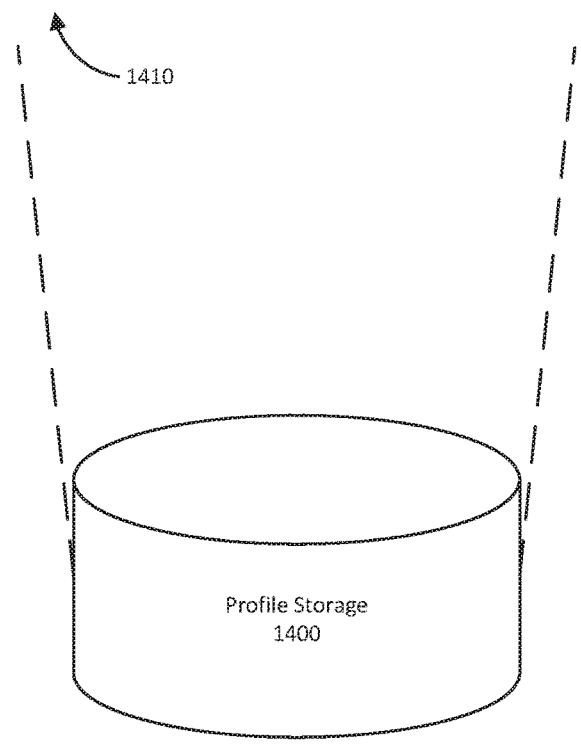
FIG. 14 illustrates data stored and associated with profiles in accordance with one or more example embodiments of the disclosure.

For example, as illustrated in FIG. 14, a group profile 1400 may include information about users, devices, and locations of the devices. In the example illustrated, the group profile 1400 is associated with a home and lists four devices: one device in a living room, one device in a kitchen, one device in a den/office, and one device in a bedroom. Various other information may also be stored and/or associated with a profile.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
receiving, by one or more computer processors coupled to memory, a request for content for presentation at a first device executing a first operating system, wherein the request is associated with a first display size of a display associated with the first device, an indication of a first operating mode active at the first device, and a first set of available inputs at the first device;
determining a first intended viewing distance value associated with the first display size, wherein the first intended viewing distance value represents a hypothetical distance from which a user views the display;
determining a first value associated with the first intended viewing distance value, wherein the first value represents a number of pixels of the first device, and wherein the number of pixels has an arcminute value of about 19 arcminutes when viewed by a user from the first intended viewing distance;
selecting a first content layout for the content using the first operating mode;
determining first content for presentation at the first device using the first value; and
sending the first content to the first device for presentation, wherein the first content is to be rendered by the first device.

2. The method of claim 1, further comprising:
receiving an indication of a second operating mode active at the first device;
determining a second set of available inputs at the first device;
determining a second intended viewing distance value associated with the second operating mode;
determining a second value associated with the second intended viewing distance value, wherein the second value represents a number of pixels of the first device, and wherein the number of pixels has an arcminute value of about 19 arcminutes when viewed by a user from the second intended viewing distance;
selecting a second content layout for the content using the second operating mode;

determining second content for presentation at the first device using the second value; and sending the second content to the first device for presentation.

3. The method of claim 1, further comprising:

receiving a request for content for presentation at a second device executing a second operating system, wherein the request is associated with a second device identifier;

determining a second display size associated with the second device identifier;

determining that a second intended viewing distance value associated with the second display size is equal to the first intended viewing distance value;

determining the first value;

determining the first content for presentation at the second device using the first value; and sending the first content to the second device for presentation, wherein the first content is rendered by the second device using a number of pixels determined using the first value.

4. The method of claim 1, further comprising:

determining a display resolution of the display;

determining a set of candidate images, wherein a first image in the set of candidate images has a different resolution;

selecting an image of the set of candidate images having a resolution that corresponds to the display resolution; and sending the image to the first device.

5. A method comprising:

receiving, by one or more computer processors coupled to memory, a request for content from a device;

determining first data representing a first device characteristic of the device;

determining an intended viewing distance value associated with the first data;

determining a first value for the first device that represents a baseline density-independent number of pixels of a base unit at the intended viewing distance;

determining first content using the first value; and sending the first content to the device, wherein the first content is to be rendered at the device.

6. The method of claim 5, wherein the base unit is greater than or equal to 14 arcminutes and less than or equal to 25 arcminutes for a hypothetical viewing distance of a user.

7. The method of claim 5, wherein the first device characteristic is one or more available input types at the device, the method further comprising:

determining a content layout for a user interface at the device using the one or more available input types.

8. The method of claim 5, wherein the first device characteristic is a first operating mode, the method further comprising:

determining a first content layout for a user interface at the device using the first operating mode;

receiving an indication from the device representing a change in operating mode from the first operating mode to a second operating mode; and determining a second content layout for the user interface at the device using the second operating mode;

wherein a first position of the first content in the first content layout is different than a second position of the first content in the second content layout.

9. The method of claim 5, wherein the base unit is consistent across a plurality of devices with different device characteristics.

10. The method of claim 5, wherein the first content comprises text, the method further comprising:

determining a second value for the text using the first value, wherein the second value represents a root em multiplier value used to determine a font size for the text; and sending the second value to the device.

11. The method of claim 10, further comprising:

determining a third value associated with the root em multiplier value, wherein the third value represents a text spacing multiplier value used to determine spacing between adjacent textual characters; and sending the text spacing multiplier value to the device.

12. The method of claim 5, further comprising:

determining a product of the first value and a margin multiplier between 1 and 4, wherein the product is a margin size for a user interface at the device, and wherein the margin size represents spacing between one or more edges of the user interface and content of the user interface.

13. The method of claim 5, further comprising:

determining that a third value for a user interface at the device is equal to the first value, wherein the third value represents spacing between columns of content at the user interface.

14. The method of claim 5, further comprising:

determining a set of text styles for a user interface at the device using the intended viewing distance value.

15. A system comprising:

memory that stores computer-executable instructions; and at least one processor configured to access the memory and execute the computer-executable instructions to:

receive a request for content from a device;

determine first data representing a first device characteristic of the device;

determine an intended viewing distance value associated with the first data;

determine an intended perceived size for first content on the device at the intended viewing distance value;

determine, using the intended perceived size and the first device characteristic, a first value for the device;

determine the first content using the first value; and send the first content to the device, wherein the first content is to be rendered at the device using a number of pixels corresponding to the first value.

16. The system of claim 15, wherein an arcminute measurement for the first content is greater than or equal to 14 and less than or equal to 25 for a hypothetical viewing distance of a user.

17. The system of claim 15, wherein the first device characteristic is one or more available input types at the device, and wherein the at least one processor is further configured to access the memory and execute the computer-executable instructions to:

determine a content layout for a user interface at the device using the one or more available input types.

18. The system of claim 15, wherein the first device characteristic is a first operating mode, and wherein the at least one processor is further configured to access the memory and execute the computer-executable instructions to:

determine a first content layout for a user interface at the device using the first operating mode;

receive an indication from the device representing a change in operating mode from the first operating mode to a second operating mode; and determine a second content layout for the user interface at the device using the second operating mode.

19. The system of claim 18, wherein a first position of the first content in the first content layout is different than a second position of the first content in the second content layout.

20. The system of claim 15, wherein the first content comprises text, and wherein the at least one processor is further configured to access the memory and execute the computer-executable instructions to:
  determine a second value for the text using the first value, wherein the second value represents a root em multiplier value used to determine a font size for the text; and
  send the second multiplier value to the device.

* * * * *